United States Patent
Sugita

(10) Patent No.: US 7,545,578 B2
(45) Date of Patent: Jun. 9, 2009

(54) IMAGE PROJECTION OPTICAL SYSTEM AND IMAGE PROJECTION APPARATUS

(75) Inventor: Shigenobu Sugita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/057,103

(22) Filed: Mar. 27, 2008

(65) Prior Publication Data
US 2008/0239507 A1    Oct. 2, 2008

(30) Foreign Application Priority Data
Mar. 29, 2007   (JP) .............................. 2007-086949

(51) Int. Cl.
*G02B 15/14* (2006.01)
(52) U.S. Cl. .................. 359/680; 359/676; 359/683
(58) Field of Classification Search .................. 359/676, 359/680–682, 683
See application file for complete search history.

(56) References Cited

U.S. PATENT DOCUMENTS

| 6,633,436 B2 | 10/2003 | Wada et al. |
| 7,079,324 B2 | 7/2006 | Yamasaki |
| 7,215,477 B2 | 5/2007 | Yamasaki et al. |
| 7,480,102 B2 * | 1/2009 | Yokoyama .................. 359/676 |

FOREIGN PATENT DOCUMENTS

| JP | 2001-235679 | 8/2001 |
| JP | 2005-266103 | 9/2005 |
| JP | 2006-084971 | 3/2006 |

* cited by examiner

*Primary Examiner*—Scott J Sugarman
(74) *Attorney, Agent, or Firm*—Canon USA Inc IP Div

(57) ABSTRACT

An image projection optical system introduces light from an image-forming element by a zoom lens via an optical element. The optical element satisfies $\Sigma(Di \times Ndi)/fw > 4.0$. The zoom lens includes, in order from a magnification side, first and second lens units, and lens units disposed closer to a reduction side than the second lens unit. The first lens unit is a negative lens unit. The lens units disposed closer to the reduction side than the second lens unit satisfy $|dn/dt| < 1.0 \times 10^{-5}$. Magnification-side positive lens elements disposed closer to the magnification side than a negative lens element whose effective diameter is smallest in the lens units disposed closer to the reduction side than the second lens unit satisfy $\{9.0 \times \Sigma(1/fpA) + 5.0 \times \Sigma(1/fpB) + 0.5 \times \Sigma(1/fpC)\}/\Sigma(1/fp) < 1$. Reduction-side positive lens elements disposed closer to the reduction side than the negative lens element whose effective diameter is smallest satisfy $\{9.0 \times \Sigma(1/fpA) + 0.3 \times \Sigma(1/fpB) + 2.0 \times \Sigma(1/fpC)\}/\Sigma(1/fp) < 1$. Chromatic aberration is corrected and focus variations by temperature changes are reduced.

6 Claims, 19 Drawing Sheets

IMAGE PROJECTION OPTICAL SYSTEM AND IMAGE PROJECTION APPARATUS

BACKGROUND OF THE INVENTION

The present invention relates to an image projection apparatus, such as a projector, an image projection optical system including a projection lens that is a zoom lens, which is used for the image projection apparatus.

Image projection apparatuses (projectors) projecting light from an image-forming element such as a liquid crystal panel onto a projection surface such as a screen should satisfy the following requirements.

1. In a three-panel projector using three image-forming elements for R, G, and B, a space is required where optical elements, such as a color-combining prism combining three color light components from the three image-forming elements and a polarizing element, between the image-forming elements and a projection lens. Thus, a back focus of the projection lens needs to be long to some extent.

2. The projection lens needs to be a telecentric optical system whose image-forming-element side pupil is located at infinite distance in order to reduce an influence of incident angle dependence of an optical film, such as a polarization splitting film, and to ensure good pupil consistency with an illumination optical system illuminating the image-forming elements with light.

3. Distortion (aberration) of the projection lens needs to be corrected well in order to prevent distortion of a projected image at its contour portion with respect to an original image.

4. When three color images are combined to be projected onto the projection surface, pixels of the three colors corresponding to each other are superposed well in the entire image area on the projection surface. Thus, color displacement (chromatic aberration of magnification) generated in the projection lens needs to be corrected well in the entire visible wavelength range.

5. The apparatus should be miniaturized.

6. A larger image can be projected at a shorter projection distance.

7. The projection lens needs to have a zoom function in order to enable selection of the size of the projected image at a certain projection distance.

8. The temperature of the optical system increases because a high intensity lamp is used as a light source, so that focal shifts (focus variation or focus displacements) and performance deterioration caused by temperature changes should be prevented.

Projection lenses for projectors satisfying the above requirements have been disclosed as follows.

Japanese Patent Laid-Open No. 2001-235679 (corresponding to U.S. Pat. No. 6,633,436) has disclosed a projection lens including six lens units that have, in order from a magnification side, negative, positive, positive, negative, positive, and positive refractive powers. The projection lens moves at least two of the six lens units to vary its magnification.

Such a negative-lead type zoom lens in which the lens unit having the negative refractive power is disposed closest to the magnification side is used for many projectors because it facilitates an increase of its field angle and has advantages that a good performance can be ensured in a short-distance projection and the like. However, in the negative-lead type zoom lens, the movement amount of a movable lens unit for magnification variation is large, so that the magnification is difficult to be increased and chromatic aberration of magnification is significantly varied.

Further, a positive lens unit is often disposed closest to the magnification side to correct the distortion, which increases the size of the zoom lens. In many recent zoom lenses as disclosed in Japanese Patent Laid-Open No. 2006-84971 (corresponding to U.S. Pat. No. 7,079,324), an aspheric lens made of plastic is used to correct the distortion, which eliminates the positive lens unit closest to the magnification side and thereby reduces the size and weight of the zoom lens.

However, the refractive index of the plastic lens is more significantly varied with the temperature changes than that of a glass lens. Therefore, the refractive index of the plastic lens is significantly varied by heat generated by projecting light, which causes focus variations and performance deterioration.

Japanese Patent Laid-Open No. 2005-266103 (corresponding to U.S. Pat. No. 7,215,477) discloses a method for correcting focus variations using two aspheric lens elements respectively having positive and negative optical powers.

However, in recent projectors, the temperature of the projection lens increases significantly with increase of their brightness (intensity), so that changes of the refractive index of glass by the temperature changes cannot be negligible as well as that of plastic.

The problem is that the change amounts of the refractive index of glass materials by the temperature changes are different depending on their constituents. Specifically, the refractive index of most glass materials included in a region of an Abbe number of vd<68 (hereinafter referred to as a C-region) changes with the temperature change by a positive amount of from $2.5 \times 10^{-6}$ to $8.5 \times 10^{-6}$(/° C.). In contrast, the refractive index of low dispersion glass materials included in a region of 68<vd<75 (hereinafter referred to as a B-region) changes by the temperature change by an amount of $-0.7 \times 10^{-6}$(/° C.), which is near zero. Further, the refractive index of ultra-low dispersion glass materials included in a region of 75<vd (hereinafter referred to as an A-region) changes with the temperature change by an amount of $-6.0 \times 10^{-6}$(/° C.), which is an amount with opposite sign to that of the materials in the C-region.

Since positive and negative lenses are generally designed to dominantly use the materials of the C-region, the focus variations are often corrected without any intention. However, the projection lens with a long back focus includes a negative lens unit having a high optical power which is disposed closer to a reduction side than an aperture stop in order to ensure a sufficient distance to a reduction side focal plane. Therefore, a larger negative spherical aberration than usual is generated. This makes it necessary to correct the spherical aberration by using a lot of surfaces having a positive optical power.

In this case, however, a positive lens unit disposed closer to the reduction side than the aperture stop is often formed of a low-dispersion material included in the A or B region so as to prevent longitudinal chromatic aberration from being exceedingly increased.

The use of the low-dispersion material for the long-back-focus projection lens generates an additional focus variation due to a temperature rise of the negative and positive lens units, resulting in a large focus variation even when using only glass materials.

BRIEF SUMMARY OF THE INVENTION

The present invention provides an image projection optical system in which the longitudinal chromatic aberration and chromatic aberration of magnification generated in a projection lens (zoom lens) can be corrected well and the focus variations due to the temperature changes can be reduced, and an image projection apparatus with the same.

According to an aspect of the present invention, an image projection optical system includes an optical element into which light from an image-forming element forming an original image enters, and a zoom lens magnifying and projecting the light from the optical element onto a projection surface.

The optical element satisfies a condition of $\Sigma(Di \times Ndi)/fw > 4.0$. The zoom lens includes, in order from a magnification side, a first lens unit, a second lens unit, and a plurality of lens units disposed closer to a reduction side than the second lens unit.

The first lens unit is a negative lens unit. The plurality of lens units disposed closer to the reduction side than the second lens unit satisfies a condition of $|dn/dt| < 1.0 \times 10^{-5}$.

Magnification-side positive lens elements disposed closer to the magnification side than a negative lens element whose effective diameter is smallest in the plurality of lens units disposed closer to the reduction side than the second lens unit satisfy a condition of:

$$\{9.0 \times \Sigma(1/fpA) + 5.0 \times \Sigma(1/fpB) + 0.5 \times \Sigma(1/fpC)\}/\Sigma(1/fp) < 1.$$

Reduction-side positive lens elements disposed closer to the reduction side than the negative lens element whose effective diameter is smallest satisfy a condition of:

$$\{9.0 \times \Sigma(1/fpA) + 0.3 \times \Sigma(1/fpB) + 2.0 \times \Sigma(1/fpC)\}/\Sigma(1/fp) < 1.$$

Di represents a length of the optical element along an optical path from the image-forming element toward the zoom lens, Ndi represents a refractive index of a material forming the optical element for a d-line, fw represents a focal length of the zoom lens at a wide-angle end, and dn/dt represents a change amount of a refractive index of a material forming each of the plurality of lens units disposed closer to the reduction side than the second lens unit for the d-line, the refractive index change being caused by a temperature change from 25° C. Further, fpA, fpB, and fpC represent focal lengths of the magnification-side positive lens elements or the reduction-side positive lens elements, whose materials are respectively included in an A-region of an Abbe number vd of vd>75, a B-region of 68<vd<75, and a C-region of 68>vd, and fp represents an entire focal length of all the magnification-side positive lens elements or all the reduction-side positive lens elements, whose materials are included in the A-region, the B-region, and the C-region.

According to another aspect, the present invention provides an image projection apparatus including the above image projection optical system and an image-forming element.

Other aspects of the present invention will be apparent from the embodiments described below with reference to the drawings.

DETAILED DESCRIPTION OF THE EMBODIMENTS

Figure 1:
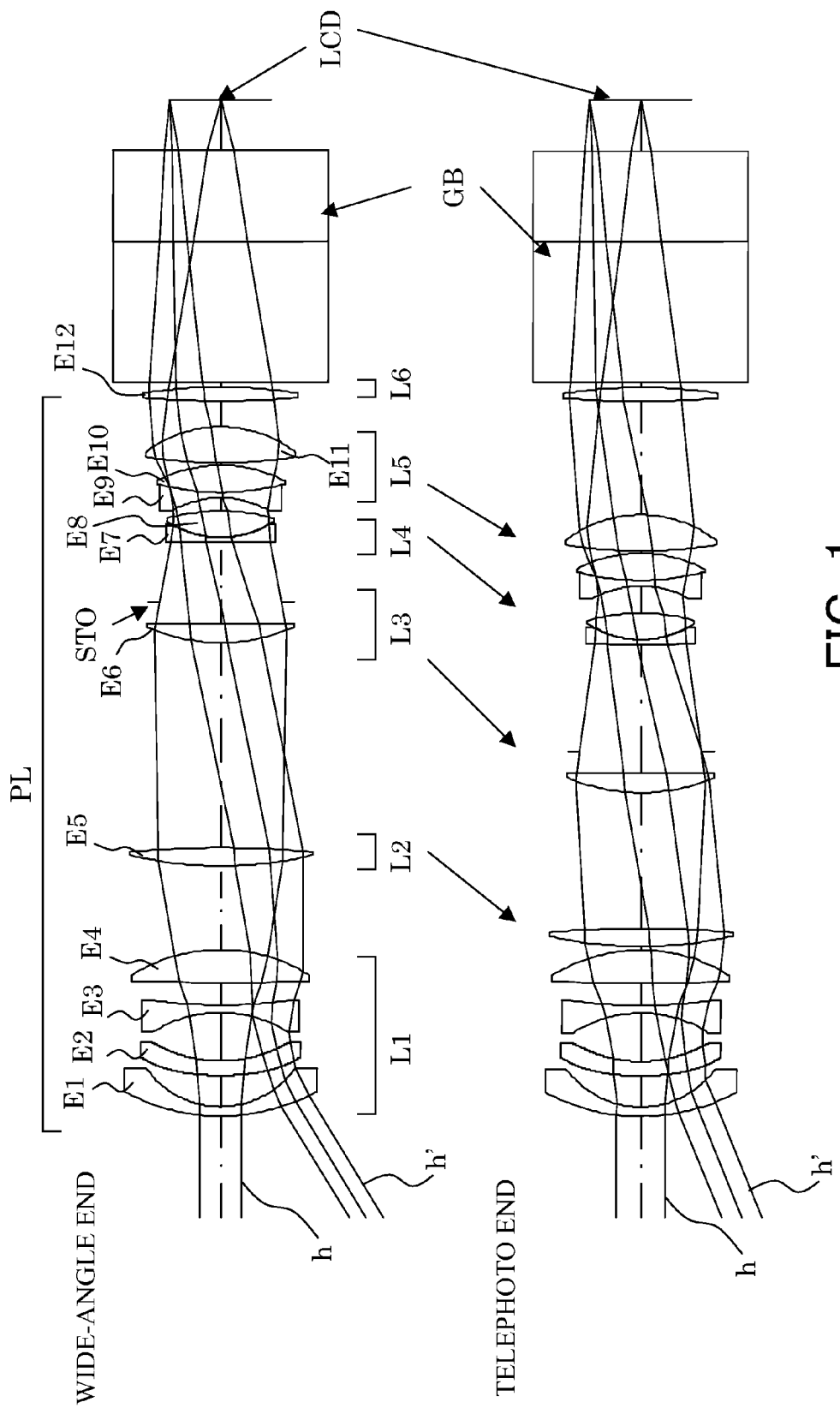
FIG. 1 schematically shows an image projection optical system that is a first embodiment (Embodiment 1) of the present invention.

Exemplary embodiments of the present invention will be described below with reference to the accompanied drawings.

First, description will be made of the basic concepts of embodiments of the present invention.

Image projection optical systems in the embodiments introduce light from an image-forming element such as a liquid crystal panel to an optical element such as a color-combining prism, and then magnify and project an image onto a projection surface such as a screen through a zoom lens (projection lens).

The optical element is disposed closer to a reduction side (or a reduction conjugate side, that is, an image-forming element side) than the zoom lens and has no optical power. The wording 'no optical power' means not only perfectly no optical power but also an extremely weak optical power that has no influence on a projected image (that is, it can be regarded as no optical power).

The wording 'extremely weak optical power' represents an optical power satisfying the following condition:

$$|fo/fw| > 100 \qquad (5)$$

where fo represents a focal length of the optical element, and fw represents a focal length of the zoom lens at a wide-angle end.

The optical power is an inverse of a focal length and can be also expressed as a refractive power in the embodiments.

The optical element satisfies the following condition (1):

$$\Sigma(Di \times Ndi)/fw > 4.0 \qquad (1)$$

where Di represents a length of the optical element along an optical path from the image-forming element toward the zoom lens, Ndi represents a refractive index of a material forming the optical element for a d-line, and fw represents a focal length of the zoom lens at a wide-angle end.

If the value of $\Sigma(Di \times Ndi)/fw$ is lower than the lower limit of the condition (1), a back focus of the zoom lens as a projection lens is short, and thereby the low-dispersion material does not need to be used for a positive lens element disposed closer to the reduction side, which will be described later.

The zoom lens includes, in order from a magnification side (or a magnification conjugate side, that is, a screen side), a first lens unit (such as a negative lens unit), a second lens unit (such as a positive lens unit), and a plurality of lens units disposed closer to the reduction side than the second lens unit.

In the embodiments, the first lens unit is disposed closest to the magnification side, and the second lens unit is disposed second closest to the magnification side (next to the first lens unit). However, the first and second lens units are not limited thereto in the present invention. That is, they may be arranged in order of the first lens unit and the second lens unit from the magnification side.

Each of the lens units disposed closer to the reduction side than the second lens unit in the embodiments satisfies the following condition (2):

$$|dn/dt| < 1.0 \times 10^{-5} \qquad (2)$$

where dn/dt represents a change amount of a refractive index of a material forming each of the lens units disposed closer to the reduction side than the second lens unit for the d-line, the refractive index change being caused by a temperature change from 25° C.

The refractive index of a material that the value of |dn/dt| is higher than the upper limit of the condition (2) is changed due to high-intensity illumination light to influence not only on focus position but also on aberration balance. Therefore, it is better not to use such a material.

In the embodiment, the condition (2) is applied to the lens units disposed closer to the reduction side than the second lens unit, since a temperature rise may not often occur at the first lens unit because a light flux density at the first lens unit is small and the first lens unit is disposed near the external air.

Magnification-side positive lens elements disposed closer to the magnification side than a negative lens element whose effective diameter is smallest in the plurality of lens units disposed closer to the reduction side than the second lens unit satisfies the following condition (3):

$$\{9.0 \times \Sigma(1/fpA) + 5.0 \times \Sigma(1/fpB) + 0.5 \times \Sigma(1/fpC)\}/\Sigma(1/fp) < 1 \qquad (3)$$

Further, reduction-side positive lens elements disposed closer to the reduction side than the negative lens element whose effective diameter is smallest satisfies the following condition (4):

$$\{9.0 \times \Sigma(1/fpA) + 0.3 \times \Sigma(1/fpB) + 2.0 \times \Sigma(1/fpC)\}/\Sigma(1/fp) < 1 \qquad (4)$$

In the conditions (3) and (4), the materials of the respective lens elements are classified to ones included in the following three regions of Abbe number vd:

A-region: 75 < vd;
B-Region: 68 < vd < 75; and
C-region: 68 > vd.

The variables in the conditions (3) and (4) are defined as follows: fpA, fpB, and fpC represent focal lengths of the magnification-side positive lens elements or the reduction-side positive lens elements, whose materials are respectively included in the A-region, the B-region, and the C-region; and fp represents an entire focal length of all the magnification-side positive lens elements or all the reduction-side positive lens elements, whose materials are included in the A-region, the B-region, and the C-region.

In the conditions (3) and (4), however, the lens element included in each of the A-, B-, and C-regions is not necessarily to be provided. For example, when the lens element in the A-region is not provided, the value of $\Sigma(1/fpA)$ is set to zero. This is also applied to a case where the lens element in the other region is not provided.

The A-, B-, and C-regions may be also expressed as follows:

A-region: $-2.0 \times 10^{-6} > dn/dt$;
B-region: $|2.0 \times 10^{-6}| < dn/dt$; and
C-region: $2.0 \times 10^{-6} < dn/dt$.

A value of the left-hand side of the condition (3) higher than the upper limit thereof shows that a proportion of the optical power of a lens element (or lens elements) formed of the material in the A-region or the B-region in the magnification-side positive lens elements disposed closer to the magnification side than the negative lens element whose effective diameter is smallest is excessively high. In this case, focus variations may be insufficiently corrected.

A value of the left-hand side of the condition (4) higher than the upper limit thereof shows that a proportion of the optical power of a lens element (or lens elements) formed of a material in the A-region or the C-region in the reduction-side positive lens elements disposed closer to the reduction side than the negative lens element whose effective diameter is smallest is excessively high. Focus variations may be insufficiently corrected if the proportion of the power of the lens element(s) in the A-region is excessively high, and chromatic aberration may be insufficiently corrected if the proportion of the power of the lens element(s) in the C-region is excessively high.

In addition to the above conditions (1) to (4), it is preferable to satisfy the following condition (5) when a lens unit disposed closest to the reduction side (most-reduction-side lens unit) does not move for varying a magnification of the zoom lens:

$$Dnwt/fe > 0.15 \qquad (5)$$

where Dnwt represents a movement amount of a lens unit that includes the negative lens element whose effective diameter is smallest between a wide-angle end and a telephoto end of the zoom lens, and fe represents a focal length of the most-reduction-side lens unit.

The wording the 'most-reduction-side lens unit does not move for varying a magnification' means that the most-reduction-side lens unit does not move when only a magnification varying operation is performed. If a focusing operation is performed during the magnification varying operation, the most-reduction-side lens unit may move for the focusing operation.

If the value of Dnwt/fe is lower than the lower limit of the condition (5), an amount of light that is cut when a zoom operation is performed from the wide-angle to the telephoto end is reduced, and thereby a significant temperature rise does not occur. Therefore, the embodiments of the present invention are effective, particularly when the value of Dnwt/fe is not lower than the lower limit of the condition (5). However, the embodiments satisfying the conditions (1) to (4) have certain effects without satisfying the condition (5).

It is more preferable that positive lens elements disposed closer to the reduction side than the first lens unit and closer to the magnification side than the negative lens element whose effective diameter is smallest satisfies the following condition (6):

$$\Sigma\{Xi\times(1/fpi)\}/\Sigma(1/fpi)<0.0015 \quad (6)$$

where Xi represents an anomalous dispersion value of a material forming an i-th positive lens element of the positive lens elements, which is counted from the magnification side, Xi being defined as:

$$Xi=\theta gFi-(0.6438-0.001682\times vdi)$$

where $\theta gFi$ represents an anomalous partial dispersion value of the material of the i-th positive lens element, which is defined as $\theta gFi=(Ng-Nf)/(Nf-Nc)$, Ng, Nf, and Nc respectively representing refractive indexes thereof for a g-line, an F-line, and a C-line, and vdi represents an Abbe number thereof, and fpi represents a focal length of the i-th positive lens element.

The value of the left-hand side of the condition (6) higher than the upper limit thereof increases a secondary spectrum, which may make it difficult to correct the chromatic aberration of magnification.

In addition to the condition (6), it is still more preferable to satisfy the following condition (7):

$$\Sigma\{Xi\times(1/fpi)\}/\Sigma(1/fpi)<0 \quad (7).$$

Further, the positive lens elements disposed closer to the reduction side than the negative lens element whose effective diameter is smallest may also satisfy the following condition (8):

$$\Sigma\{Xi\times(1/fpi)\}/\Sigma(1/fpi)>0 \quad (8).$$

The value of the left-hand side of the condition (7) higher than the upper limit thereof increases the secondary spectrum, which may make it difficult to correct the chromatic aberration of magnification.

Exemplary configurations of the zoom lens of the embodiments are as follows:

1. A six-lens-unit configuration including, in order from the magnification side, the first lens unit having a negative optical power (the optical power is hereinafter simply referred to as the power), the second lens unit having a positive power, a third lens unit having a positive power, a fourth lens unit having a negative power, a fifth lens unit having a positive power, and a sixth lens unit having a positive power.

2. A six-lens-unit configuration including, in order from the magnification side, the first lens unit having a negative power, the second lens unit having a positive power, a third lens unit having a positive power, a fourth lens unit having a positive power, a fifth lens unit having a positive power or a (weak) negative power, and a sixth lens unit having a positive power.

3. A five-lens-unit configuration including, in order from the magnification side, the first lens unit having a negative power, the second lens unit having a positive power, a third lens unit having a positive power, a fourth lens unit having a positive power or a (weak) negative power, and a fifth lens unit having a positive power.

Figure 19:
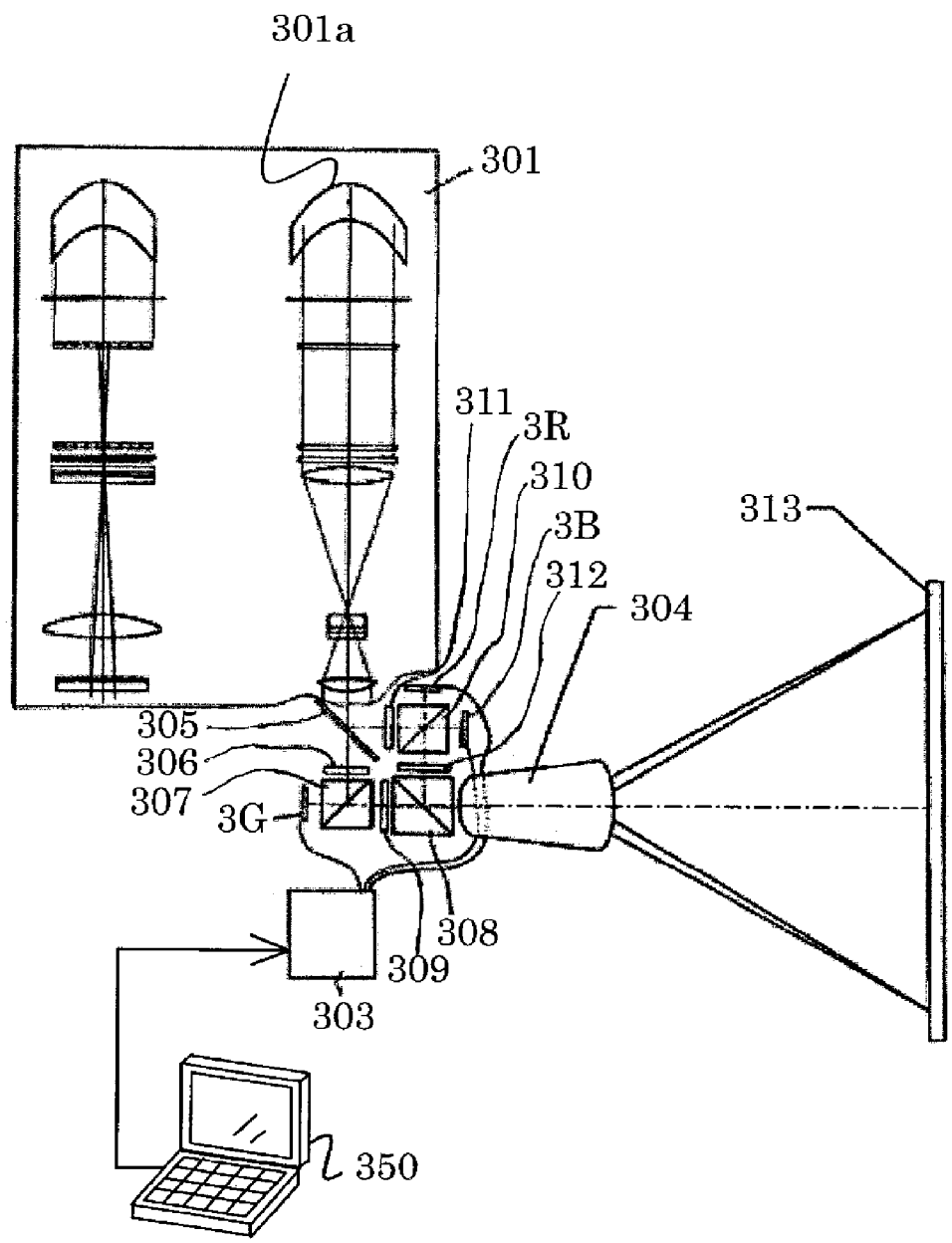
FIG. 19 is a plane view showing the configuration of a projector using the image projection optical system of one of Embodiments 1 to 6.

The above-described image projection optical system is used for a projector (image projection apparatus) shown in FIG. 19.

In FIG. 19, reference numeral 303 shows a liquid crystal driver. The liquid crystal driver 303 receives a video signal (image information) from an image supply apparatus 350 such as a personal computer, a DVD player, and a television tuner. The liquid crystal driver 303 converts the video signal into driving signals for a red (R) liquid crystal display element 3R, a green (G) liquid crystal display element 3G, and a blue (B) liquid crystal display element 3B, all of which are reflective liquid crystal display elements. Thus, the red liquid crystal display element 3R, the green liquid crystal display element 3G, and the blue liquid crystal display element 3B are individually controlled. The projector and the image supply apparatus 350 constitute an image display system.

Although this embodiment describes the projector using the reflective liquid crystal display element as the image-forming element, a digital micro mirror device may be used as the image-forming element.

Reference numeral 301 shows an illumination optical system. Shown on the left in a box in FIG. 19 is the side view of the illumination optical system 301 shown on the right. The illumination optical system 301 converts white light emitted from a light source lamp 301a such as a high-pressure mercury lamp into linearly-polarized light having a polarization direction perpendicular to the sheet of FIG. 19 and directs the polarized light toward a dichroic mirror 305.

The dichroic mirror 305 in this embodiment reflects light in magenta and transmits light in green.

The magenta light component in the white light is deflected and introduced toward a blue cross color polarizer 311.

The blue cross color polarizer 311 provides retardation of one-half wavelength for polarized light in blue. This produces a blue light component that is linearly-polarized light having a polarization direction in parallel with the sheet of FIG. 19 and a red light component that is linearly-polarized light having a polarization direction perpendicular to the sheet of FIG. 19.

Next, the blue light component enters a first polarization beam splitter 310 as P-polarized light and is transmitted through a polarization splitting film thereof toward the liquid crystal display element 3B for blue. The red light component enters the first polarization beam splitter 310 as S-polarized light and is reflected by the polarization splitting film thereof toward the liquid crystal display element 3R for red.

On the other hand, after the transmission through the dichroic mirror 305, the green light component passes through a dummy glass 306 for correcting the length of an optical path and then enters a second polarization beam splitter 307. The green light component having the polarization direction perpendicular to the sheet of FIG. 19 is S-polarized light for a polarization splitting film of the second polarization beam splitter 307, so that the green light component is reflected thereby and is introduced toward the liquid crystal display element 3G for green.

As described above, the illumination light enters the red liquid crystal display element 3R, the green liquid crystal display element 3G, and the blue liquid crystal display element 3B.

Each of the liquid crystal display elements provides retardation for the entering illumination light (polarized light) in accordance with the modulation state of pixels arranged on the liquid crystal display element. Of reflected light from each liquid crystal display element, the light component polarized in the same direction as that of the illumination light is generally returned along the optical path of the illumination light toward the light source lamp 301a.

Of the reflected light from each liquid crystal display element, image light formed of the light component polarized in the direction perpendicular to the polarization direction of the illumination light travels in the following manner.

The red light component that is linearly-polarized light having the polarization direction in parallel with the sheet of FIG. 19 emerges from the red liquid crystal display element 3R and is transmitted through the polarization splitting film of the first polarization beam splitter 310 as P-polarized light and then transmitted through a red cross color polarizer 312. The red cross color polarizer 312 provides retardation of one-half wavelength for the red light component. This converts the red light component into linearly-polarized light having the polarization direction perpendicular to the sheet of FIG. 19.

The red light component enters a third polarization beam splitter 308 as S-polarized light and is reflected by a polarization splitting film thereof toward a projection lens 304.

The blue light component that is linearly-polarized light having the polarization direction perpendicular to the sheet of FIG. 19 emerges from the blue liquid crystal display element 3B and is reflected by the polarization splitting film of the first polarization beam splitter 310 as S-polarized light and then transmitted through the red cross color polarizer 312 without any change. The blue light component enters the third polarization beam splitter 308 as S-polarized light and is reflected by the polarization splitting film thereof toward the projection lens 304.

The green light component that is linearly-polarized light having the polarization direction in parallel with the sheet of FIG. 19 emerges from the green liquid crystal display element 3G and is transmitted through the polarization splitting film of the second polarization beam splitter 307 and then transmitted through a dummy glass 309 for correcting the length of the optical path.

The blue light component enters the third polarization beam splitter 308 as P-polarized light, is transmitted through the polarization splitting film thereof, and is introduced to the projection lens 304.

After the color combination in the third polarization beam splitter 308, the red, green, and blue light components are taken by an entrance pupil of the projection lens 304 and are transferred to a light diffusion screen (projection surface) 313. Since the light modulation surfaces of the respective liquid crystal display elements and the optical diffusion surface of the screen 313 are disposed in an optically conjugate relationship by the projection lens 304, an image based on the video signal is projected (displayed) on the screen 313.

The red liquid crystal display element 3R, the green liquid crystal display element 3G, and the blue liquid crystal display element 3B are adjusted such that the light components from the associated pixels overlap on the screen 313 with predetermined accuracy.

The second polarization beam splitter 307, the dummy glass 309, and the third polarization beam splitter 308 correspond to the above-described optical element.

Description will hereinafter be made of Embodiments 1 to 6 of the image-projection optical system with reference to FIGS. 1, 4, 7, 10, 13, and 16. The image-projection optical system of each of Embodiments 1 to 6 magnifies (enlarges) and projects light that comes from an original image formed on a liquid crystal panel LCD and passes through a glass block GB onto a screen (not shown) by a zoom lens (projection lens) PL. The glass block GB includes, as described above, the polarization beam splitters 310, 307, and 308 and the dummy glass 309, which are shown in FIG. 19.

In each of Embodiments 1 to 6, the screen surface and the liquid crystal panel LCD are brought into a conjugate relationship by the zoom lens PL. In general, a screen-side conjugate point at a longer distance from the zoom lens corresponds to a magnification-side conjugate point, and a liquid-crystal-panel-side conjugate point at a shorter distance from the zoom lens corresponds to a reduction-side conjugate point. According to this, a screen side with respect to the zoom lens PL is referred to as a magnification side, and a liquid crystal panel side with respect to the zoom lens PL is referred to as a reduction side.

Reference character STO denotes an aperture stop provided in the zoom lens PL.

The zoom lens PL is mounted on a main body of the projector (not shown) via a connecting member (not shown). The glass block GB and the liquid crystal panel LCD, which are disposed closer to the reduction side than the zoom lens PL, are provided inside the main body of the projector.

The zoom lens PL has telecentricity in which its liquid-crystal-panel-side pupil is located at an infinite distance to ensure good pupil consistency with the illumination optical system (shown by reference numeral 301 in FIG. 19)

The glass block GB has roles of combining the light components from three liquid crystal panels (LCD) for R, G, and B, and selectively transmitting only polarized light having a specific polarization direction, changing the phase of polarized light, and the like.

The zoom lens PL is a negative-lead type lens in which a lens unit having a negative refractive power is disposed closest to the magnification side. This readily ensures a sufficiently long back focus for placing the glass block GB.

The zoom lens PL has a configuration including a magnification varying function for changing a synthesized focal length of all the lens units by moving one or more lens units along an optical axis of the zoom lens PL.

Embodiment 1

Figure 2:
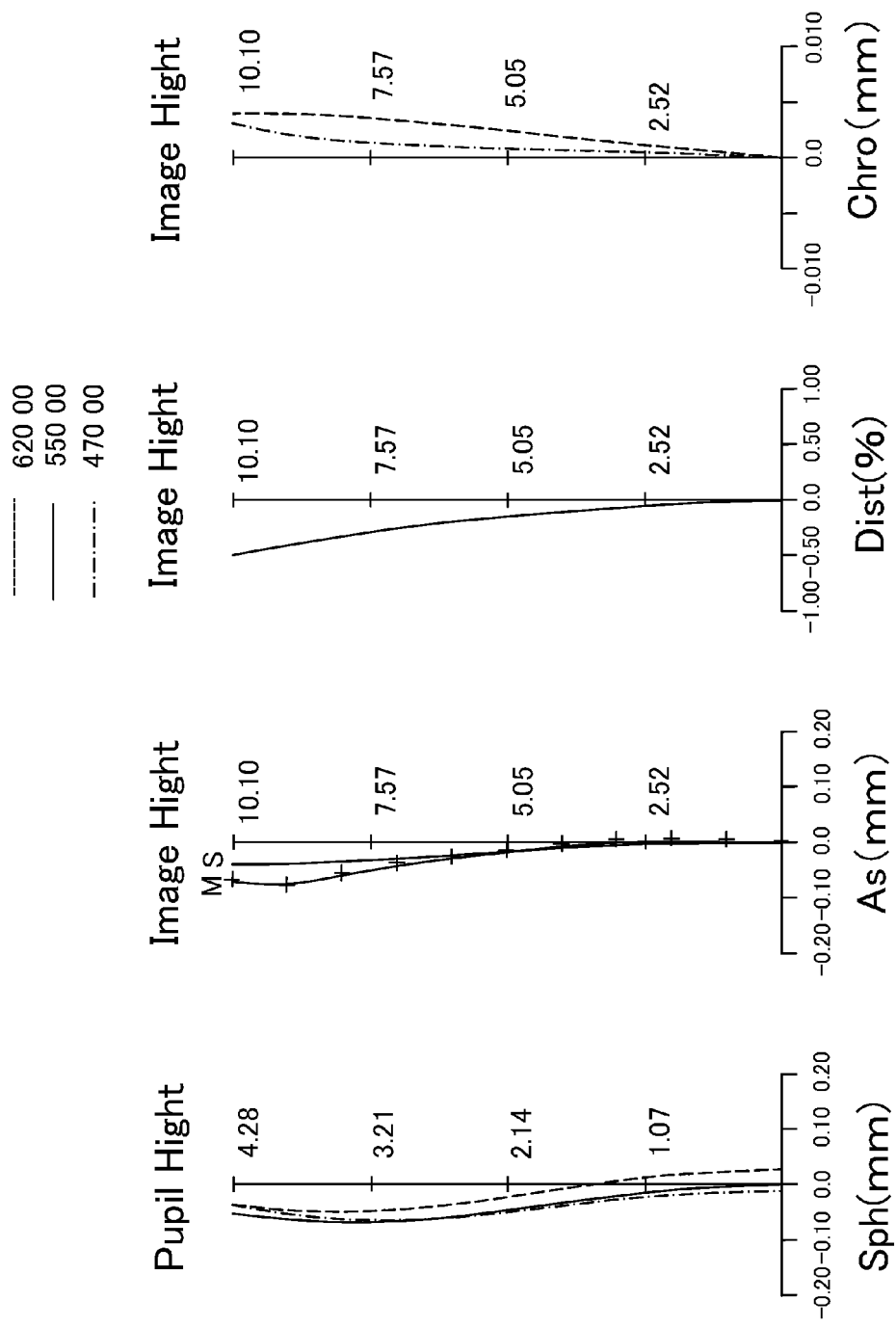
FIG. 2 is an aberration diagram of a zoom lens of Embodiment 1 (Numerical Example 1) at a wide-angle end at an object distance of 2,100 mm.
Figure 3:
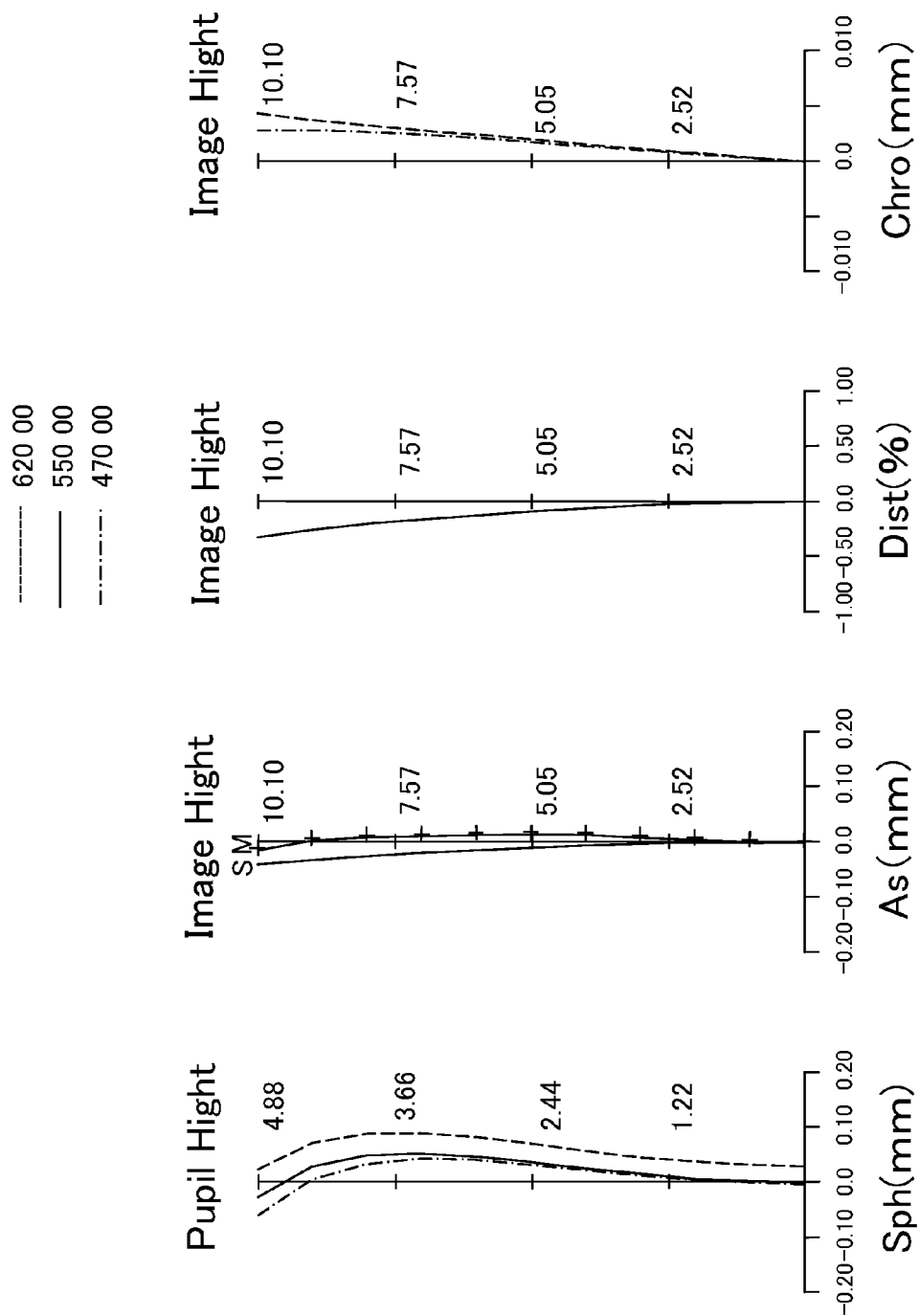
FIG. 3 is an aberration diagram of the zoom lens of Embodiment 1 (Numerical Example 1) at a telephoto end at the object distance of 2,100 mm.

FIG. 1 schematically shows the image projection optical system of Embodiment 1. FIGS. 2 and 3 show spherical aberration (Sph), astigmatism (As), distortion (Dst), and chromatic aberration of magnification (Chro) at the wide-angle end and at the telephoto end, respectively, when numerical values of Numerical Example 1 corresponding to this embodiment are shown in millimeters.

FIG. 1 shows the image projection optical system including a six-lens-unit zoom lens having a power arrangement of negative, positive, positive, negative, positive, and positive in order from the magnification side.

The first lens unit L1 is constituted by, in order from the magnification side, a negative meniscus lens element E1 having a magnification-side convex surface, an aspheric lens element E2, a negative lens element E3 having a strong power, and a positive lens element E4 having a reduction-side convex surface with a strong power.

The negative meniscus lens element E1 has a negative power on its reduction-side surface at which an off-axis principle ray height h' is small to obtain a wide field angle and a positive power on its magnification-side surface at which the off-axis principle ray height h' is large to correct distortion.

The aspheric lens element E2 and the negative lens element E3 have strong powers to obtain a wide field angle and an effect to correct distortion caused by the strong power. The positive lens element E4 having the reduction-side convex surface with the strong power corrects distortion and chromatic aberration of magnification that are generated by the negative lens element E3 having the strong power.

The second lens unit L2 is constituted by one biconvex lens element E5 having a strong positive power and is a movable lens unit. Further, the second lens unit L2 effectively corrects, at a position where the off-axis principle ray height h' is large, distortion and chromatic aberration of magnification that are generated by the first lens unit L1 having a strong negative power.

The third lens unit L3 is constituted by, in order from the magnification side, a biconvex lens element E6 and the aperture stop STO. The third lens unit L3 moves with the second lens unit L2 along the optical axis to change the synthesized focal length thereof to provide a magnification varying effect.

The fourth lens unit L4 is a negative lens unit constituted by one cemented lens in which a negative meniscus lens element E7 having a magnification-side convex surface and a biconvex lens element E8 are cemented to each other, the lens element E7 being disposed closer to the magnification side than the lens element E8. The fourth lens unit L4 has a compensating function of correcting spherical aberration and longitudinal chromatic aberration that are generated by the movement of the second and third lens units L2 and L3 for magnification variation.

Disposing the fourth lens unit L4 at a position where an axial principal ray height h is large and the off-axis principal ray height h' is small enables the correction of the spherical aberration and longitudinal chromatic aberration while suppressing generation of chromatic aberration of magnification.

The fifth lens unit L5 is a positive lens unit having a relatively weak power and is constituted by, in order from the magnification side, one cemented lens in which a biconcave lens element E9 and a biconvex lens element E10 are cemented to each other, and a biconvex lens element E11. The fifth lens unit L5 corrects chromatic aberration of magnification and field curvature well in the entire magnification variation range.

The sixth lens unit L6 is constituted by only one positive lens element E12 and has a function of weakening a synthesized refractive power of the first to fifth lens units L1 to L5. This is advantageous for increasing the field angle and the aperture size.

The negative meniscus lens element E7 having the magnification-side convex surface in the fourth lens unit L4 corresponds to the 'negative lens element whose effective diameter is smallest'.

The two positive lens elements E5 and E6 in the second and third lens units L2 and L3, which are disposed closer to the magnification side than the negative meniscus lens element E7, are formed of a material in the C-region and satisfy the condition (3). These two positive lens elements E5 and E6 effectively correct the focus variations due to the temperature changes. Further, the two positive lens elements E5 and E6 satisfying the condition (6) reduce the secondary spectrum.

The biconvex lens element E8 in the fourth lens unit L4 and the two biconvex lens elements E10 and E11 in the fifth lens unit L5, which are disposed closer to the reduction side than the negative meniscus lens element (negative lens element whose effective diameter is smallest) E7, are formed of a material in the B-region.

The positive lens element E12 in the sixth lens unit L6 is formed of a material in the C-region.

These positive lens elements E8, E10, E11, and E12 satisfy the condition (4) and thereby effectively correct the chromatic aberration of magnification and the longitudinal chromatic aberration. Further, the positive lens elements E8, E10, E11, and E12 satisfying the condition (8) reduce the secondary spectrum.

The above-described features of Embodiment 1 can achieve good optical performances at the wide-angle end and at the telephoto end as shown in FIGS. 2 and 3 and suppress the focus variations due to the temperature rise.

Embodiment 2

Figure 4:
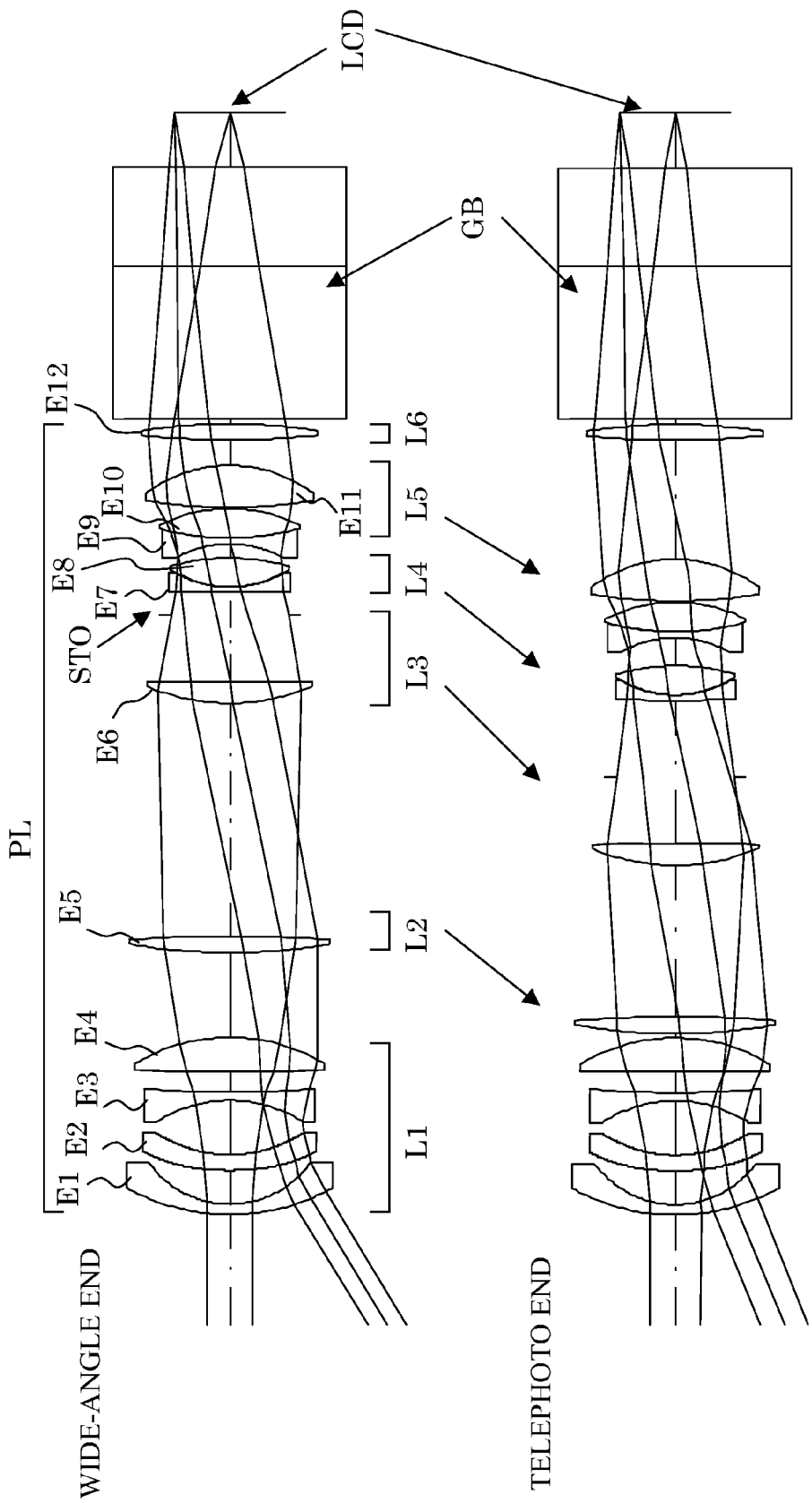
FIG. 4 schematically shows an image projection optical system that is a second embodiment (Embodiment 2) of the present invention.
Figure 5:
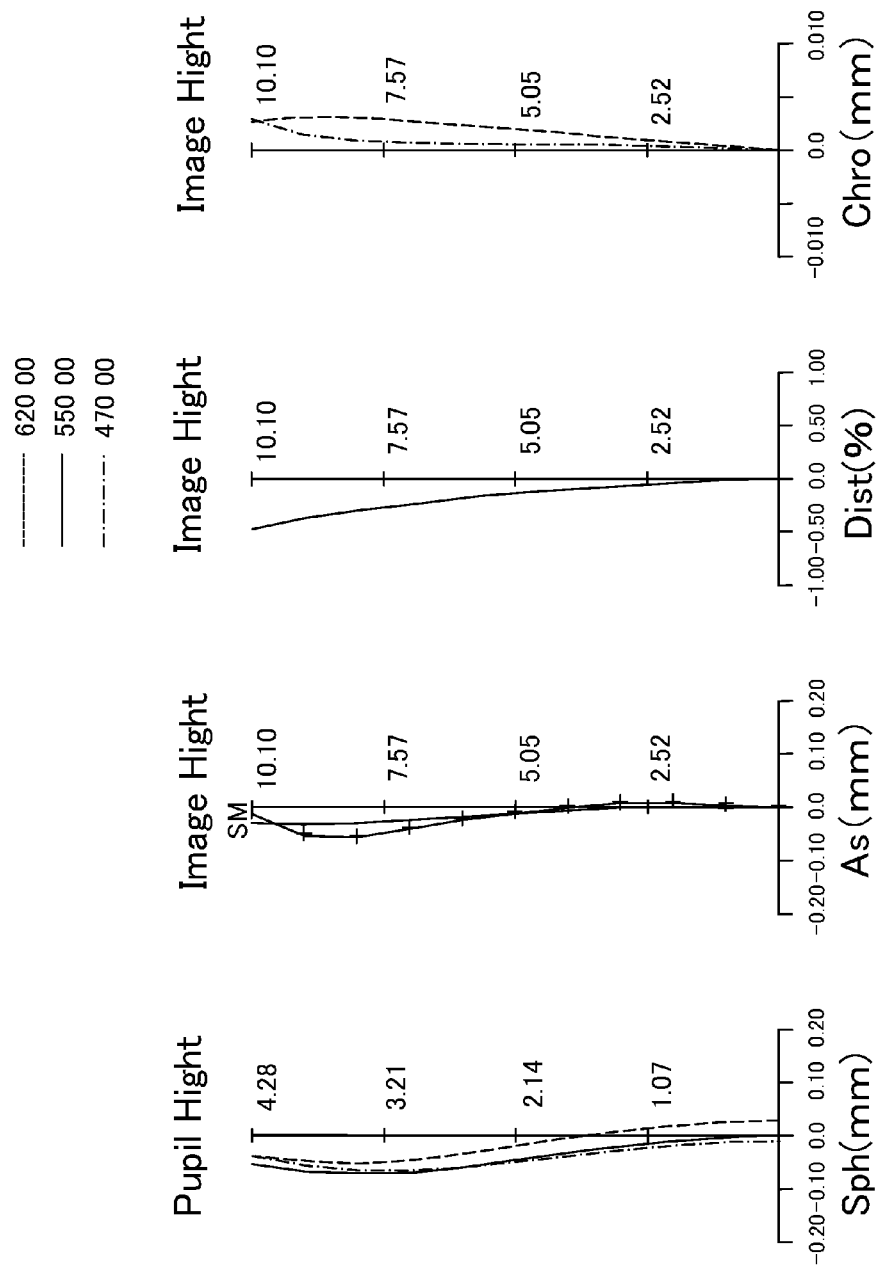
FIG. 5 is an aberration diagram of a zoom lens of Embodiment 2 (Numerical Example 2) at a wide-angle end at an object distance of 2,100 mm.
Figure 6:
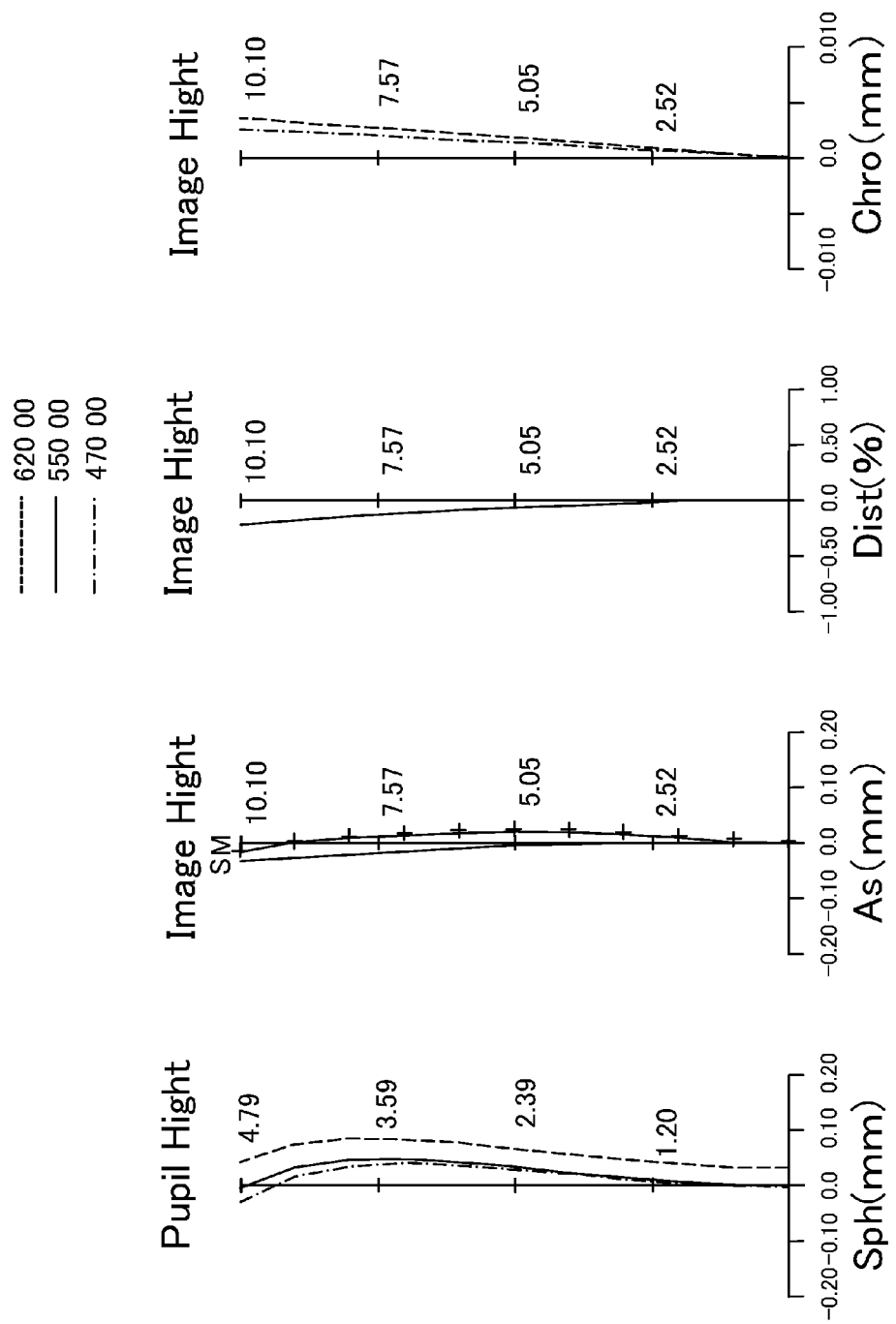
FIG. 6 is an aberration diagram of the zoom lens of Embodiment 2 (Numerical Example 2) at a telephoto end at the object distance of 2,100 mm.

FIG. 4 schematically shows the image projection optical system of Embodiment 2. FIGS. 5 and 6 show spherical aberration (Sph), astigmatism (As), distortion (Dst), and chromatic aberration of magnification (Chro) at the wide-angle end and at the telephoto end, respectively, when numerical values of Numerical Example 2 corresponding to this embodiment are shown in millimeters.

FIG. 4 shows the image projection optical system including a six-lens-unit zoom lens having a power arrangement of negative, positive, positive, positive, negative, and positive in order from the magnification side.

The zoom lens of this embodiment is different from that of Embodiment 1 in that the synthesized power of a fourth lens unit L4 is positive and that of a fifth lens unit L5 is negative. Lens units L1 to L6 in this embodiment respectively have similar functions to those of the lens units L1 to L6 in Embodiment 1.

The zoom lens of this embodiment can also achieve good optical performances at the wide-angle end and at the telephoto end as shown in FIGS. 5 and 6 and suppress the focus variations due to the temperature rise.

Embodiment 3

Figure 7:
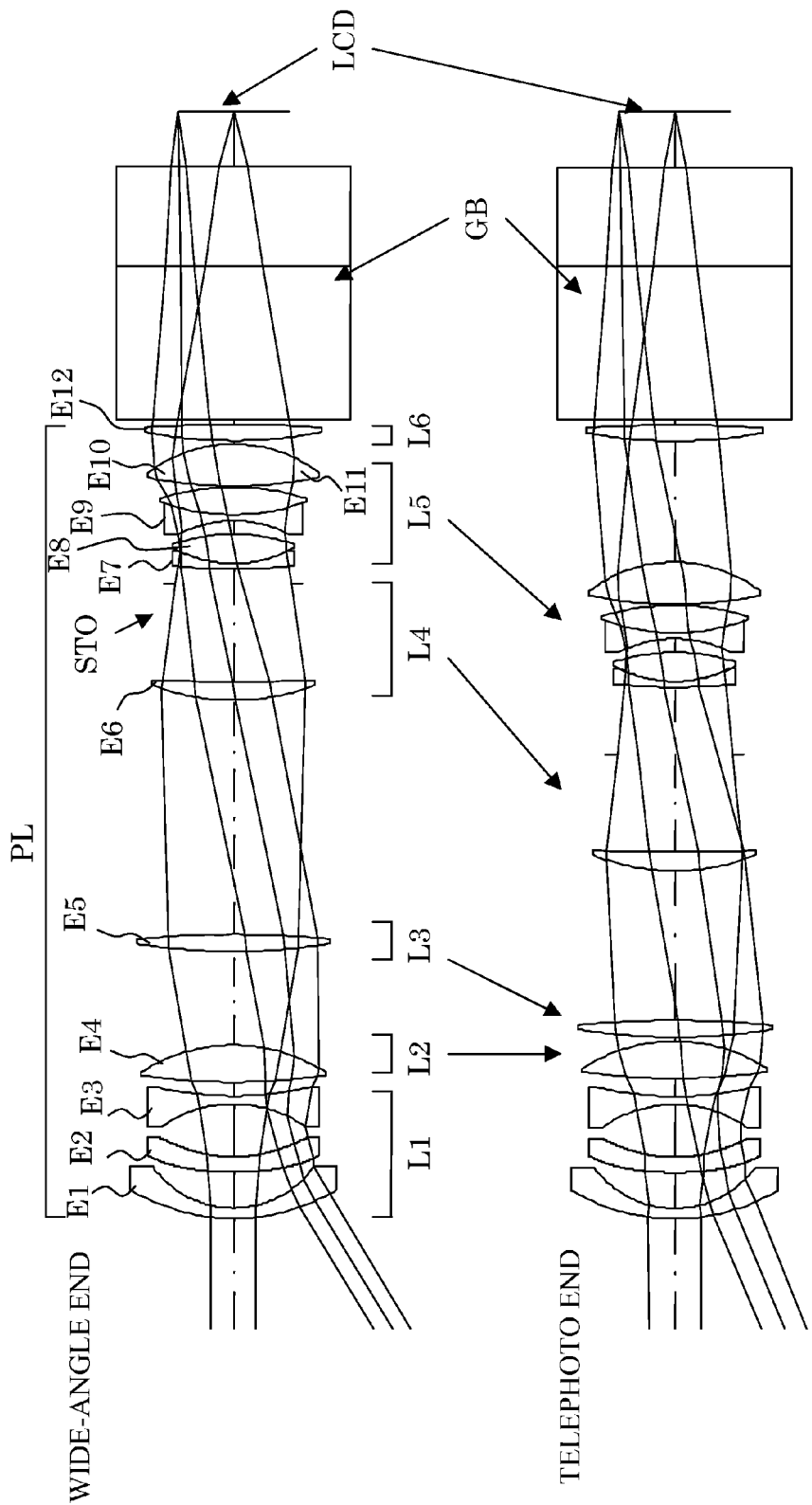
FIG. 7 schematically shows an image projection optical system that is a third embodiment (Embodiment 3) of the present invention.
Figure 8:
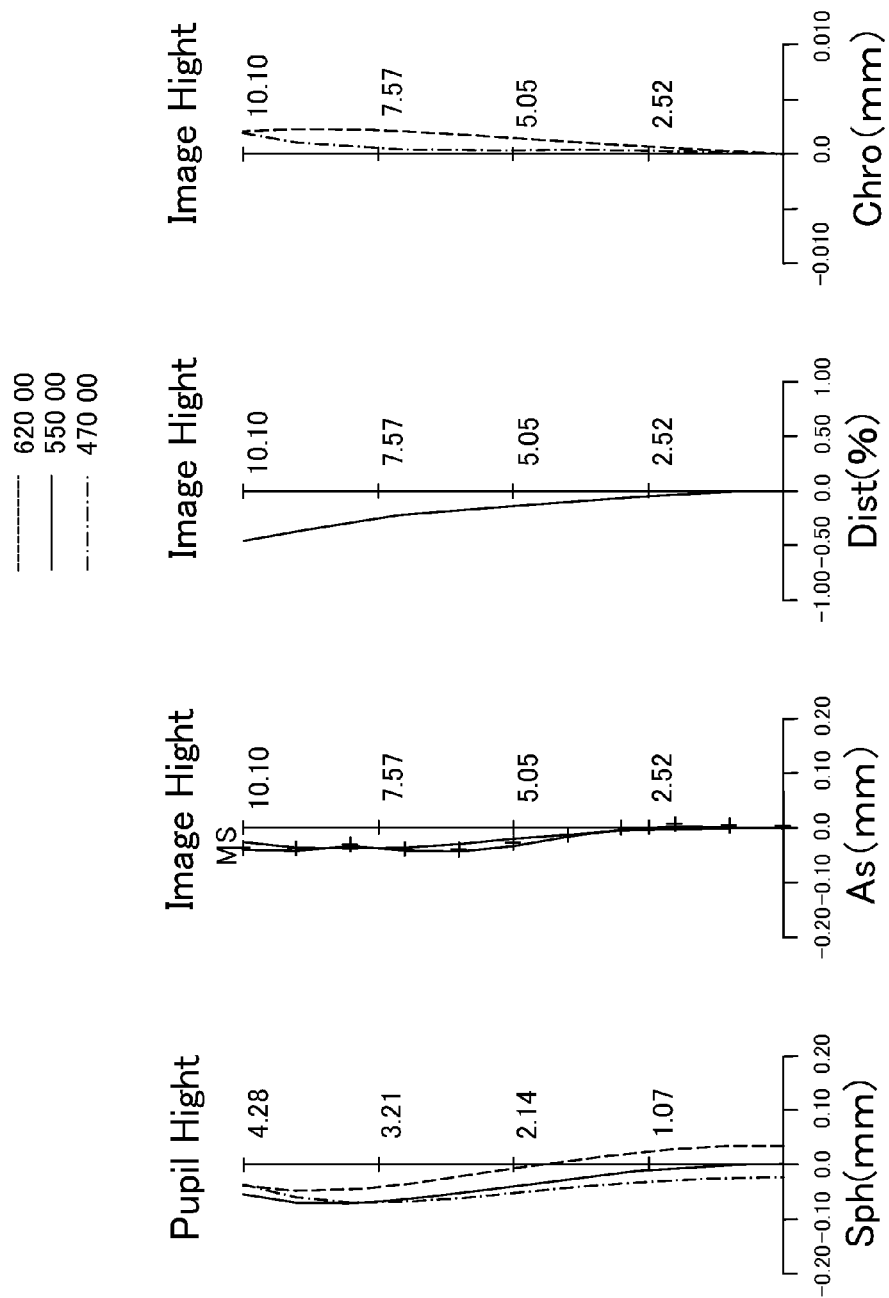
FIG. 8 is an aberration diagram of a zoom lens of Embodiment 3 (Numerical Example 3) at a wide-angle end at an object distance of 2,100 mm.
Figure 9:
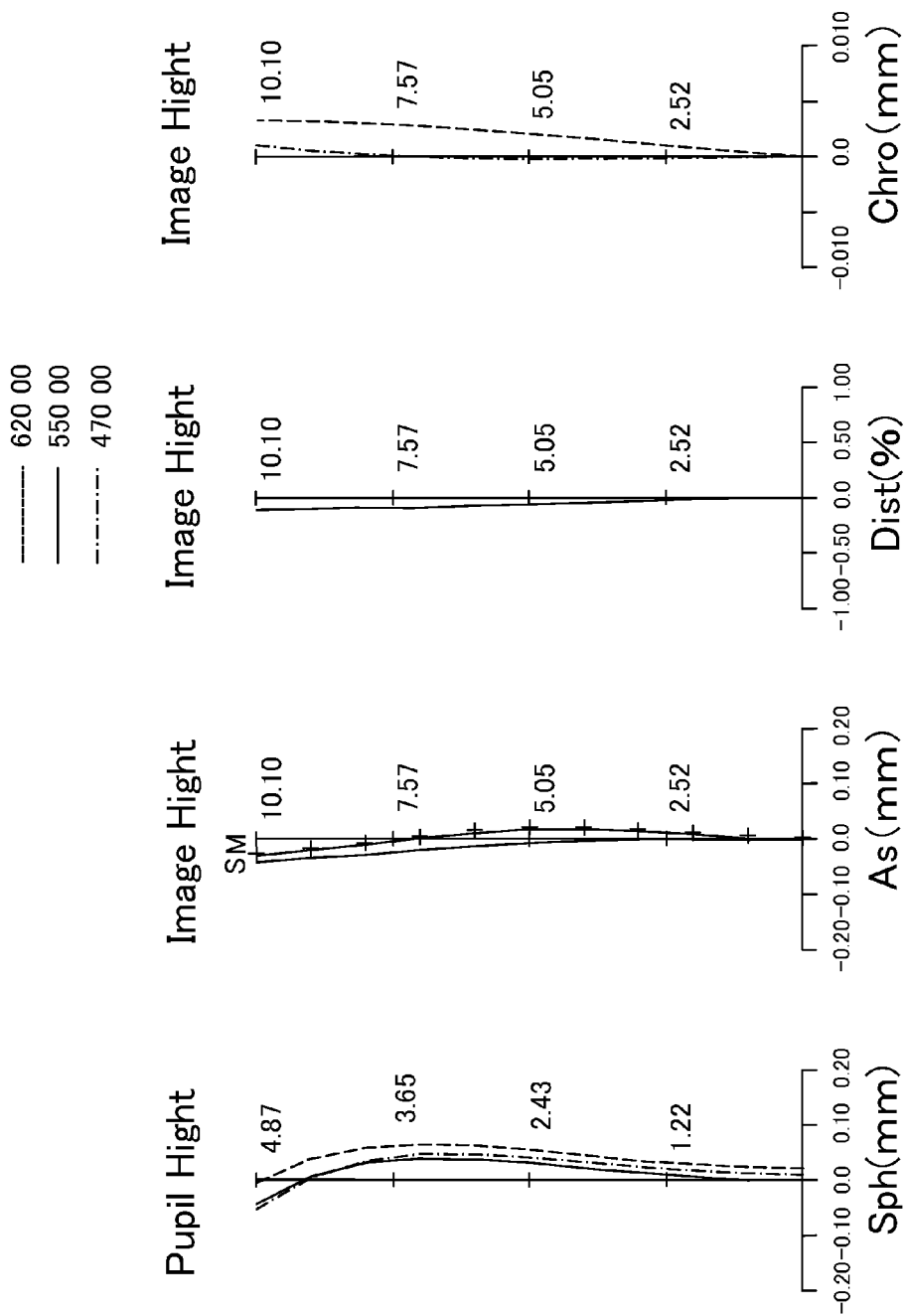
FIG. 9 is an aberration diagram of the zoom lens of Embodiment 3 (Numerical Example 3) at a telephoto end at the object distance of 2,100 mm.

FIG. 7 schematically shows the image projection optical system of Embodiment 3. FIGS. 8 and 9 show spherical aberration (Sph), astigmatism (As), distortion (Dst), and chromatic aberration of magnification (Chro) at the wide-angle end and at the telephoto end, respectively, when numerical values of Numerical Example 3 corresponding to this embodiment are shown in millimeters.

FIG. 7 shows the image projection optical system including a six-lens-unit zoom lens having a power arrangement of negative, positive, positive, positive, positive, and positive in order from the magnification side.

The zoom lens of this embodiment is different from that of Embodiment 1 in that two lens units corresponding to the fourth and fifth lens units L4 and L5 in Embodiment 1 constitute a fifth lens unit L5. Of the four lens elements E1 to E4 constituting the first lens unit L1 in Embodiment 1, three magnification-side lens elements E1 to E3 serve as a first lens unit in this embodiment and a lens element E4 closest to the reduction side serves as a second lens unit L2 in this embodiment.

Further, the second lens unit L2 in Embodiment 1 serves as a third lens unit L3 in this embodiment, and the third lens unit L3 in Embodiment 1 serves as a fourth lens unit L4 in this embodiment.

This configuration enables, by the movement of the second lens unit L2, correction of variation of field curvature that is not sufficiently corrected by the first lens unit L1.

This embodiment can also achieve good optical performances at the wide-angle end and at the telephoto end as shown in FIGS. 8 and 9 and suppress the focus variations due to the temperature rise.

Embodiment 4

Figure 10:
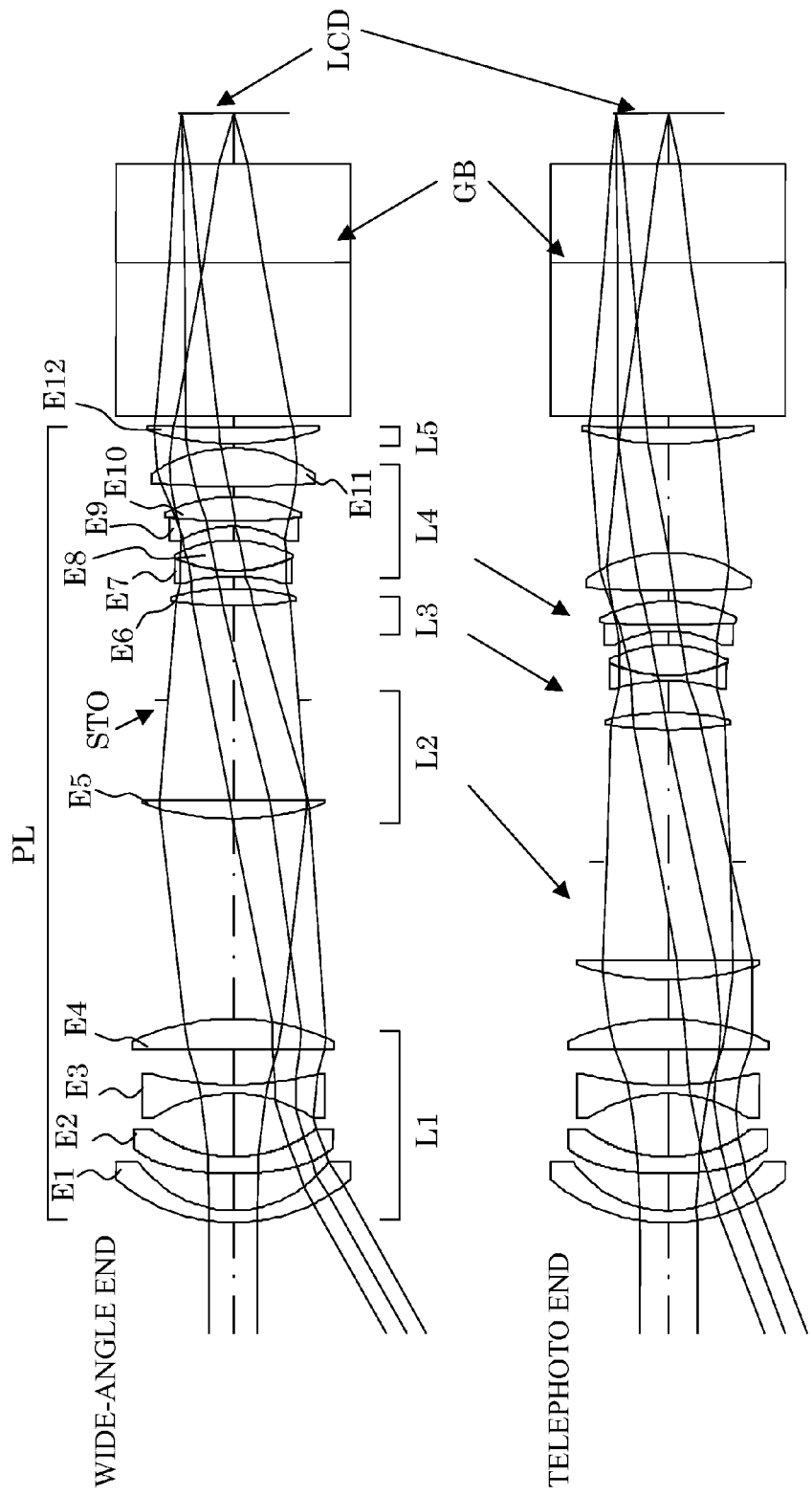
FIG. 10 schematically shows an image projection optical system that is a fourth embodiment (Embodiment 4) of the present invention.
Figure 11:
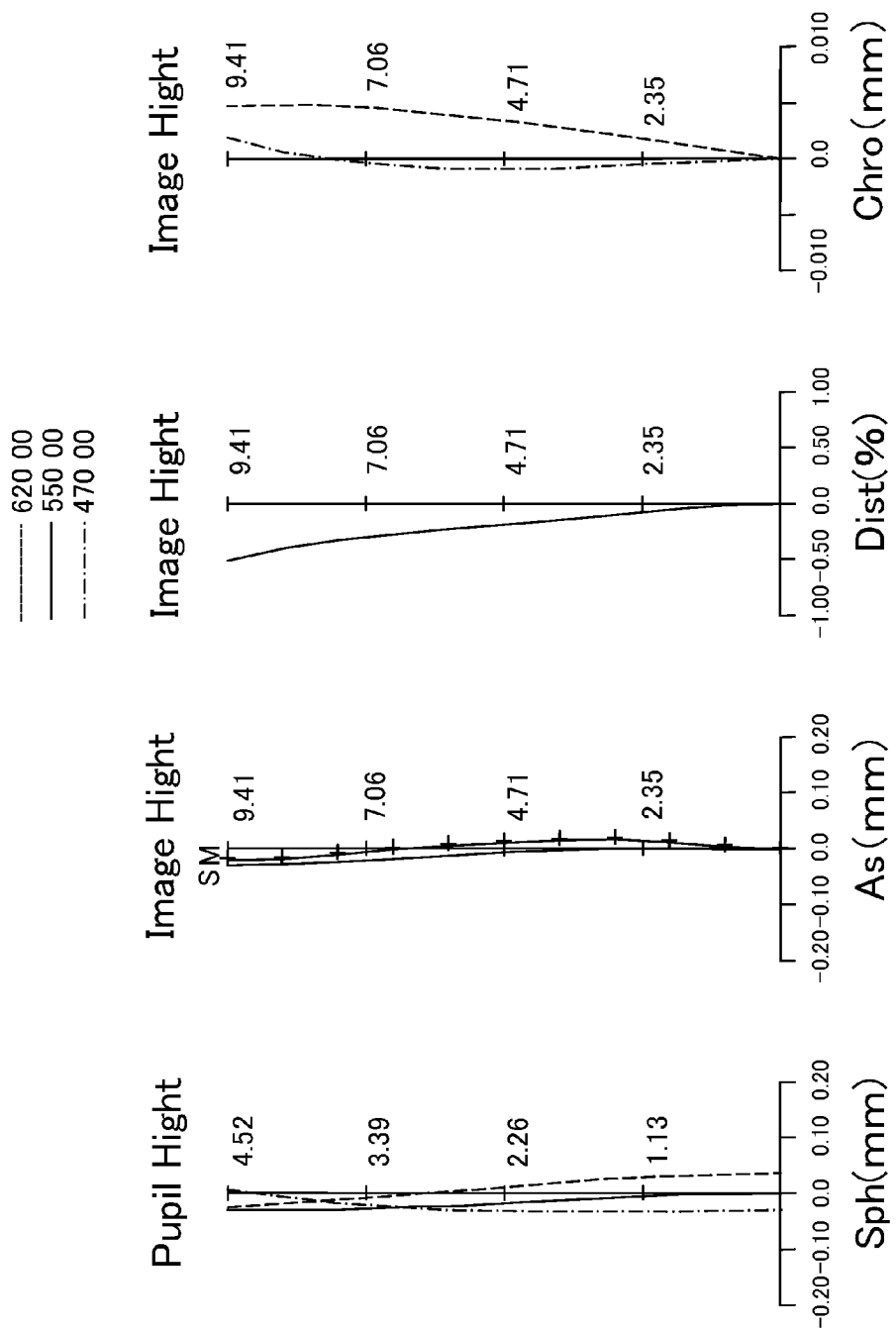
FIG. 11 is an aberration diagram of a zoom lens of Embodiment 4 (Numerical Example 4) at a wide-angle end at an object distance of 2,100 mm.
Figure 12:
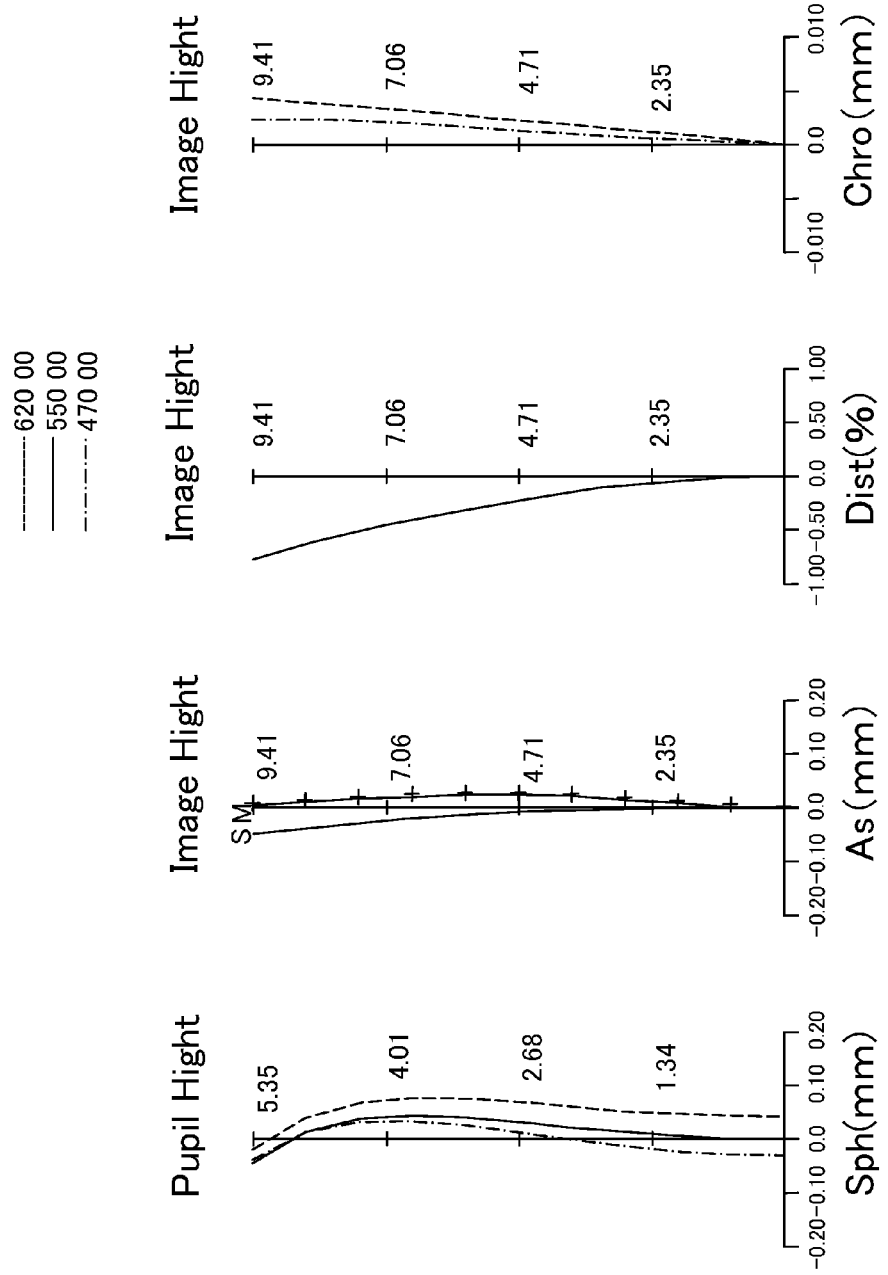
FIG. 12 is an aberration diagram of the zoom lens of Embodiment 4 (Numerical Example 4) at a telephoto end at the object distance of 2,100 mm.

FIG. 10 schematically shows the image projection optical system of Embodiment 4. FIGS. 11 and 12 show spherical aberration (Sph), astigmatism (As), distortion (Dst), and chromatic aberration of magnification (Chro) at the wide-angle end and at the telephoto end, respectively, when numerical values of Numerical Example 4 corresponding to this embodiment are shown in millimeters.

FIG. 10 shows the image projection optical system including a five-lens-unit zoom lens having a power arrangement of negative, positive, positive, positive, and positive in order from the magnification side.

The zoom lens of this embodiment is different from that of Embodiment 1 in that two lens units corresponding to the fourth and fifth lens units L4 and L5 in Embodiment 1 constitute a fourth lens unit L4. In other words, this embodiment corresponds to a case where the fourth and fifth lens units L4 and L5 in Embodiment 1 have a positive synthesized power. Lens units L1 to L5 in this embodiment respectively have similar functions to those in Embodiment 1.

This embodiment can also achieve good optical performances at the wide-angle end and at the telephoto end as shown in FIGS. 11 and 12 and suppress the focus variations due to the temperature rise.

Embodiment 5

Figure 13:
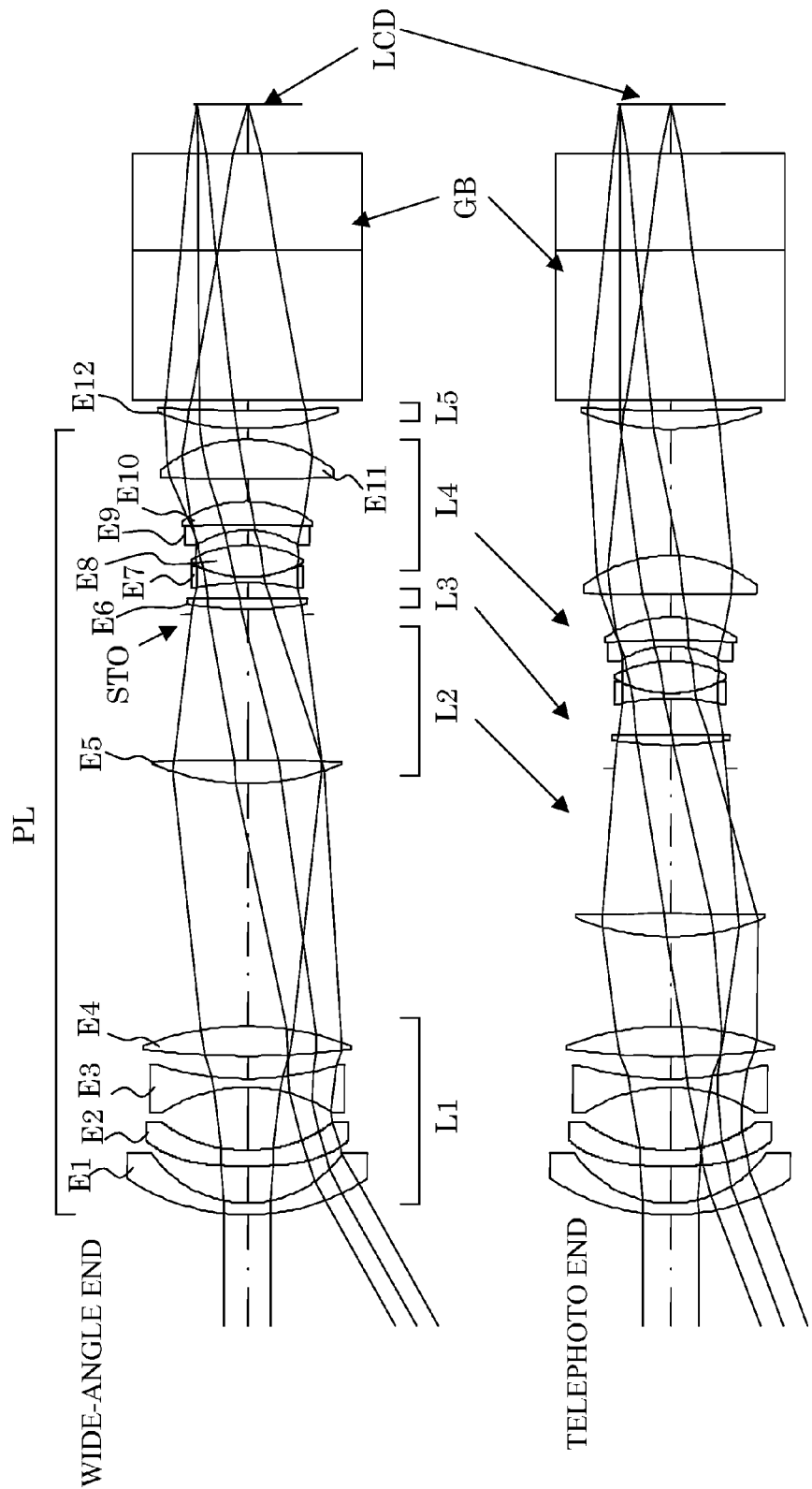
FIG. 13 schematically shows an image projection optical system that is a fifth embodiment (Embodiment 5) of the present invention.
Figure 14:
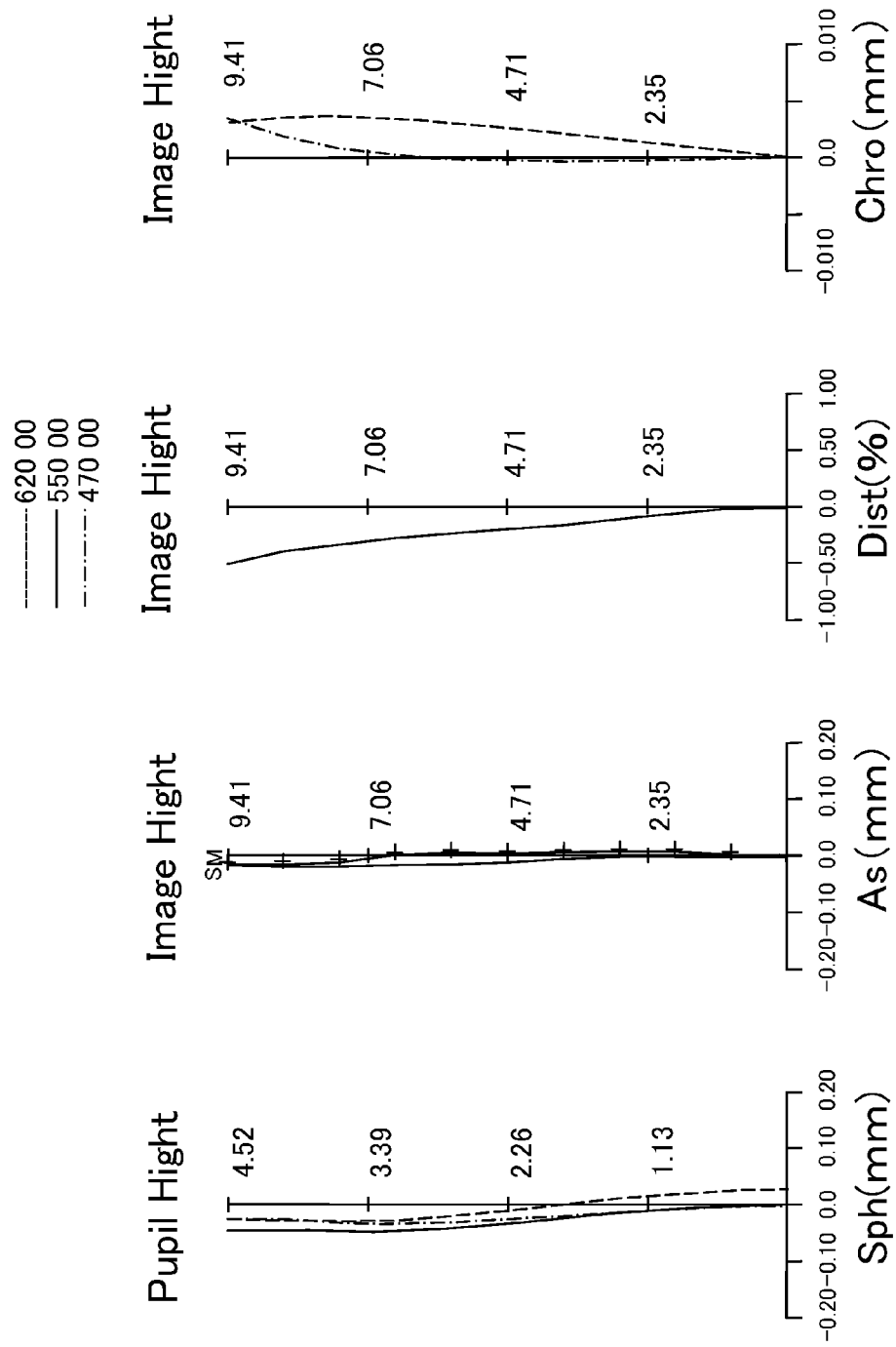
FIG. 14 is an aberration diagram of a zoom lens of Embodiment 5 (Numerical Example 5) at a wide-angle end at an object distance of 2,100 mm.
Figure 15:
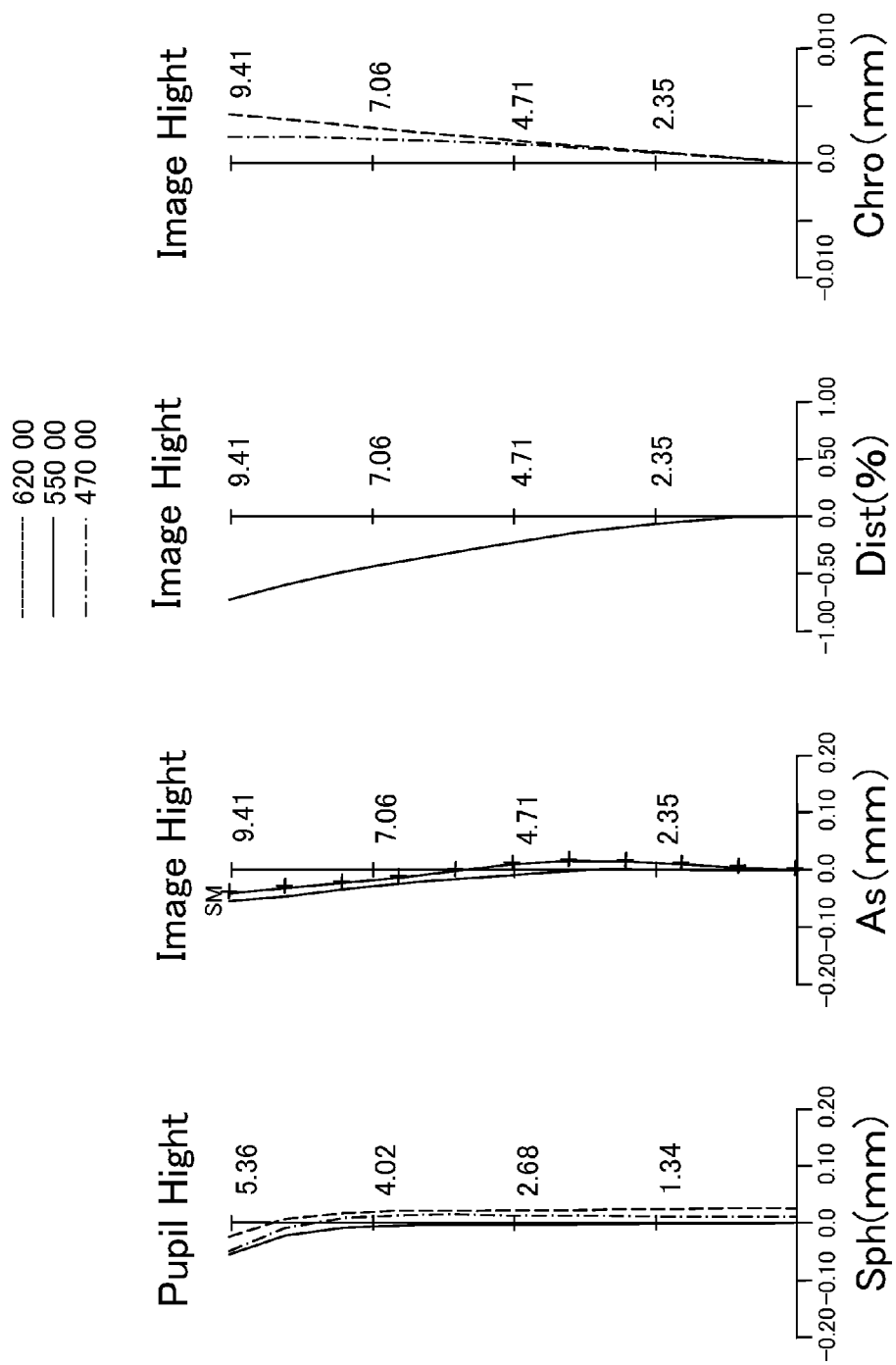
FIG. 15 is an aberration diagram of the zoom lens of Embodiment 5 (Numerical Example 5) at a telephoto end at the object distance of 2,100 mm.

FIG. 13 schematically shows the image projection optical system of Embodiment 5. FIGS. 14 and 15 show spherical aberration (Sph), astigmatism (As), distortion (Dst), and chromatic aberration of magnification (Chro) at the wide-angle end and at the telephoto end, respectively, when numerical values of Numerical Example 5 corresponding to this embodiment are shown in millimeters.

FIG. 13 shows the image projection optical system including a five-lens-unit zoom lens having a power arrangement of negative, positive, positive, positive, and positive in order from the magnification side.

The zoom lens of this embodiment is different from that of Embodiment 1 in that, as in Embodiment 4, two lens units corresponding to the fourth and fifth lens units L4 and L5 in Embodiment 1 constitute a fourth lens unit L4. In other words, this embodiment corresponds to a case where the fourth and fifth lens units L4 and L5 in Embodiment 1 have a positive synthesized power. Lens units L1 to L5 in this embodiment respectively have similar functions to those in Embodiment 1.

This embodiment can also achieve good optical performances at the wide-angle end and at the telephoto end as shown in FIGS. 14 and 15 and suppress the focus variations due to the temperature rise.

Embodiment 6

Figure 16:
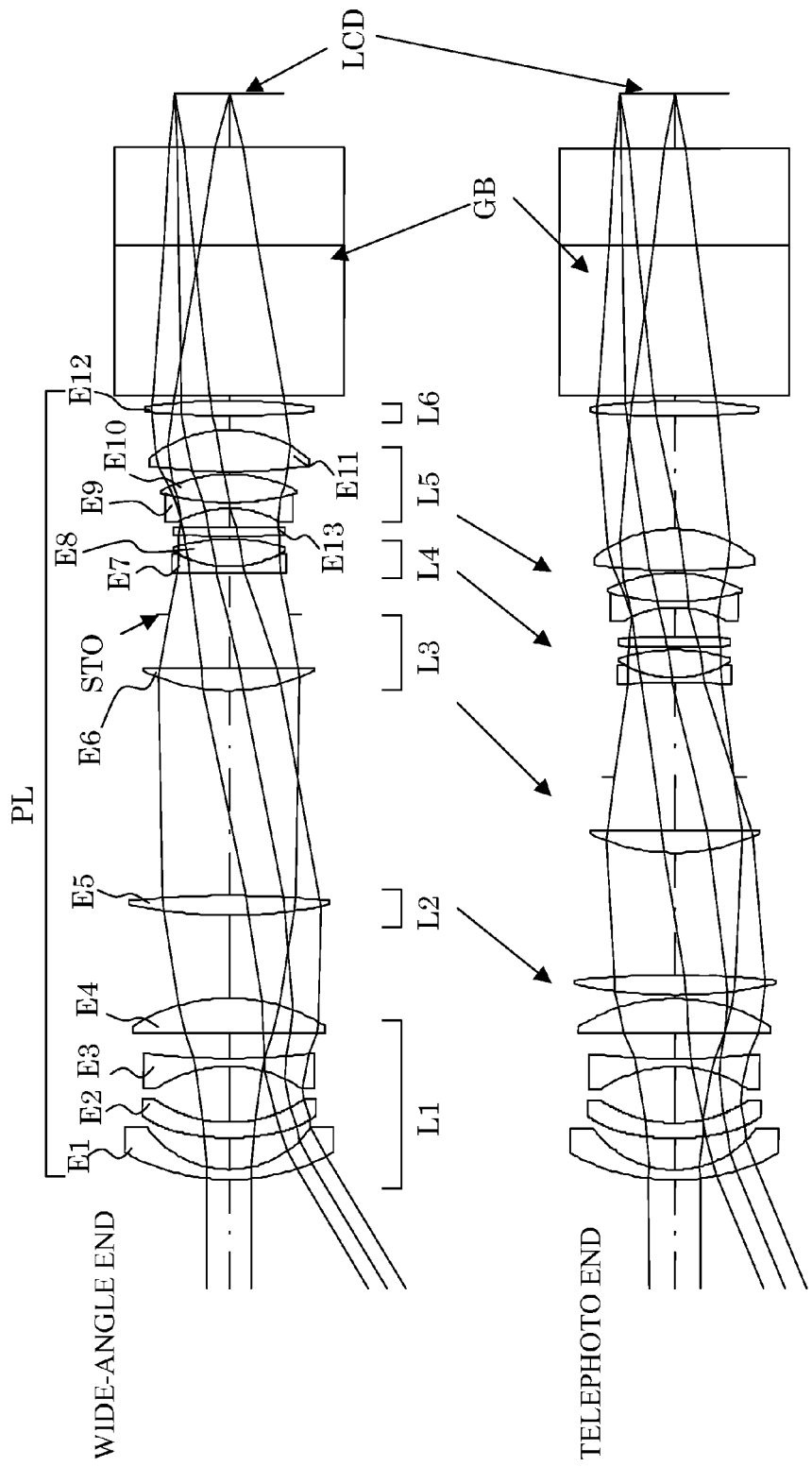
FIG. 16 schematically shows an image projection optical system that is a sixth embodiment (Embodiment 6) of the present invention.
Figure 17:
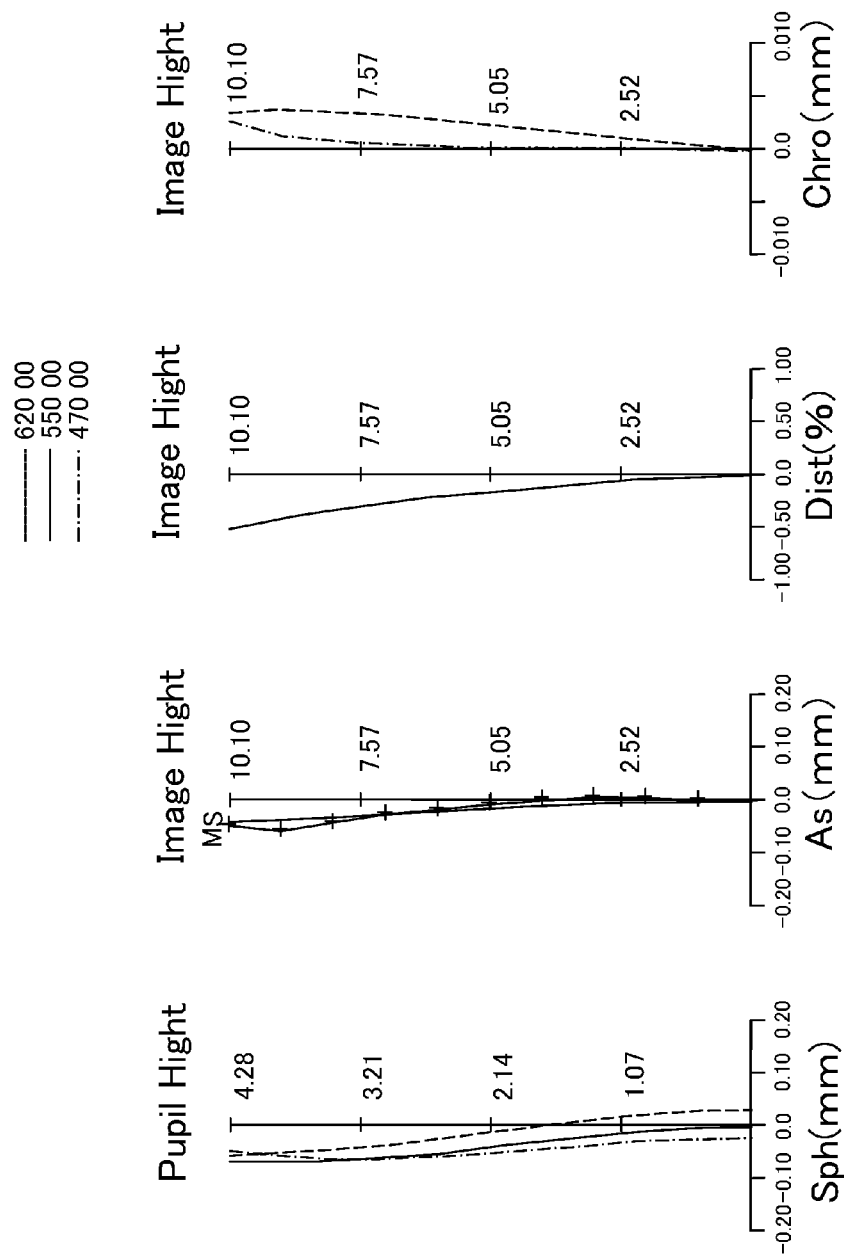
FIG. 17 is an aberration diagram of a zoom lens of Embodiment 6 (Numerical Example 6) at a wide-angle end at an object distance of 2,100 mm.
Figure 18:
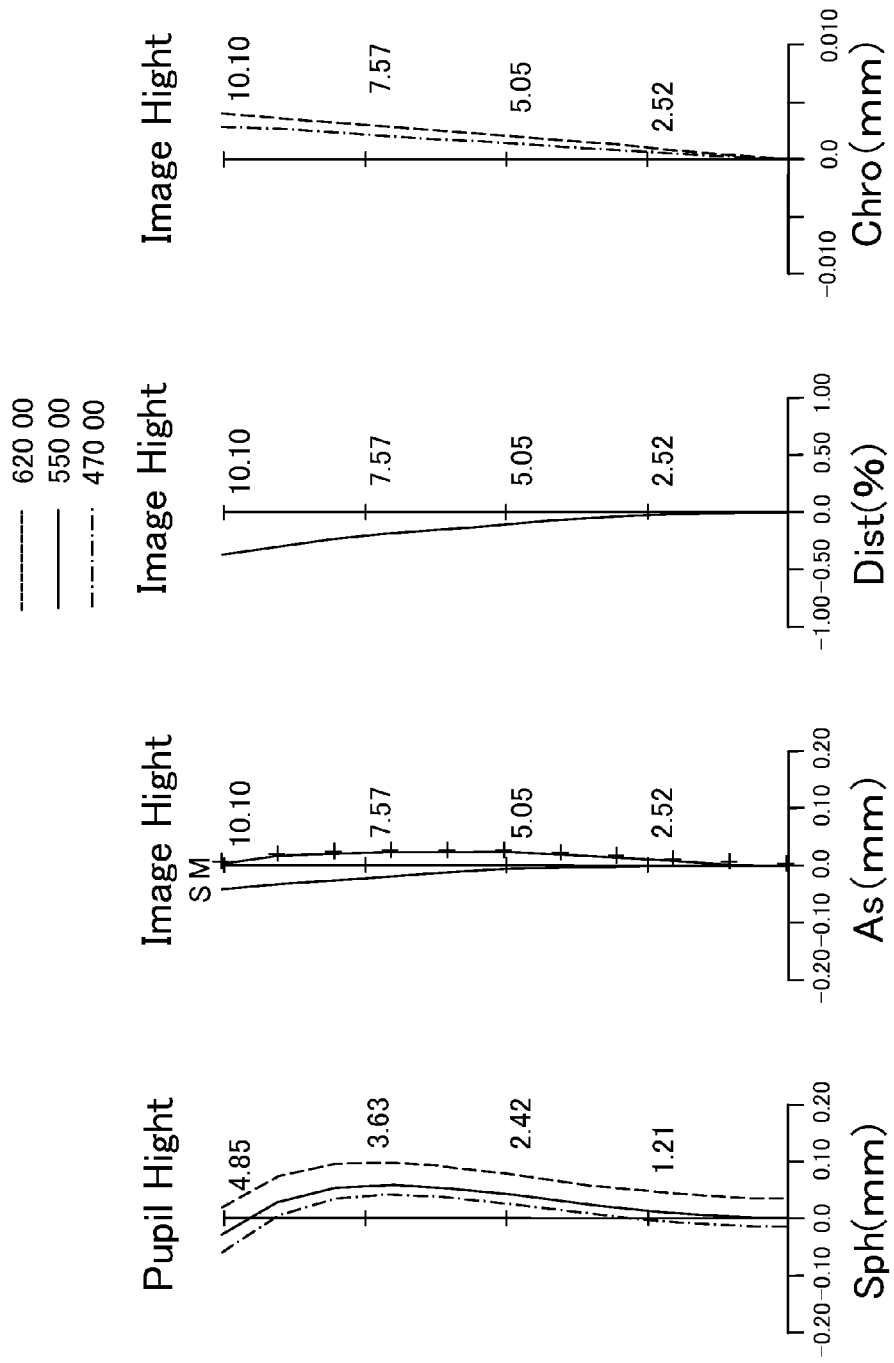
FIG. 18 is an aberration diagram of the zoom lens of Embodiment 6 (Numerical Example 6) at a telephoto end at the object distance of 2,100 mm.

FIG. 16 schematically shows the image projection optical system of Embodiment 6. FIGS. 17 and 18 show spherical aberration (Sph), astigmatism (As), distortion (Dst), and chromatic aberration of magnification (Chro) at the wide-angle end and at the telephoto end, respectively, when numerical values of Numerical Example 6 corresponding to this embodiment are shown in millimeters.

FIG. 16 shows the image projection optical system including a six-lens-unit zoom lens having a power arrangement of negative, positive, positive, negative, positive, and positive in order from the magnification side.

The zoom lens of this embodiment is different from that of Embodiment 1 in that a positive lens element E13 formed of a material in the A-region is added to the fourth lens unit L4 in Embodiment 1.

As shown Table 7, even though the fourth lens unit L4 includes the positive lens element E13 formed of the material in the A-region, the above-described conditions are satisfied if the power of the positive lens element E13 is sufficiently weak. Thus, this embodiment can also achieve good optical performances as shown in FIGS. 17 and 18 and suppress the focus variations due to the temperature rise.

In Embodiments 1 to 6, the optical element (glass block GB) disposed closer to the reduction side than the zoom lens satisfies the condition (1), thereby providing a sufficiently long back focus for the zoom lens.

Further, in Embodiments 1 to 6, the lens elements disposed closer to the reduction side than the second lens unit L2 satisfy the condition (2), that is, a material whose refractive index changes significantly is not used.

Moreover, Embodiments 1 to 6 satisfy the condition (5). This means that the amount of light cut at the telephoto end is large and thereby the temperature may increase significantly. Therefore, particularly in this case, Embodiments 1 to 6 are effective to suppress the focus variations.

Numerical Examples 1 to 6 corresponding to the zoom lenses of Embodiments 1 to 6 are respectively shown in Tables 1 to 6.

In each of Numerical Examples 1 to 6, the order of each optical surface from the magnification side is shown by 'i', the curvature radius of each optical surface is shown by 'r', the distance between the i-th surface and the (i+1)-th surface is shown by 'd', and the refractive index and the Abbe number of the material of the optical member (lens element and prism) for the d-line are respectively shown by 'Nd' and 'vd'. The change amount of the refractive index of the optical member by a temperature change from a normal temperature (25° C.) is shown by 'dn/dt'.

In each numerical example, the anomalous dispersion value X is shown which is defined as X=θgF−(0.6438−0.001682×vd). θgF denotes an anomalous partial dispersion value.

In each numerical example, fw represents a focal length of the zoom lens at the wide-angle end, ft represents a focal length of the zoom lens at the telephoto end, and Fno represents an F-number. The word 'variable' in the section of the distance d shows that the distance is changed by the magnification variation. The variable distances at the wide-angle end and at the telephoto end are shown in each table. The optical surfaces with symbol '#' are aspheric surfaces.

The aspheric surface is expressed by the following expression:

$$x = (y^2/r)/[1+\{1-(1+K)(y^2/r^2)\}^{1/2}] + Ay^4 + By^6 + Cy^8 + Dy^{10} + Ey^{12}$$

where x represents a distance from an apex of the surface in the optical axis direction, y represents a height from the optical axis in a direction orthogonal thereto, r denotes a paraxial curvature radius, K represents a conic constant, and A, B, C, D, and E represent aspheric coefficients.

In addition, 'E±G' in each aspheric coefficient means '×10±G'.

Table 7 shows numerical values corresponding to the above-described conditions (1) to (7) in Numerical Examples 1 to 6. In Table 7, the conditions (1) to (7) are shown by circled numbers 1 to 7. The numerical value for the condition (8) is the same as that of the condition (7). In Table 7, P denotes a positive power, and N denotes a negative power.

TABLE 1

NUMERICAL EXAMPLE 1 fw: 16.69
ft: 24.72
Fno: 1.95~2.53

|  | r | d | Nd | vd | dn/dt($10^{-6}$) | X |
|---|---|---|---|---|---|---|
| SCREEN |  | 2100.00 |  |  |  |  |
| 1 | 39.99 | 1.90 | 1.74950 | 35.3 | 6.2 | 0.0024 |
| 2 | 18.24 | 6.20 |  |  |  |  |
| 3(#) | 60.00 | 2.80 | 1.52996 | 55.8 | −83.9 | — |
| 4(#) | 26.53 | 9.66 |  |  |  |  |
| 5 | −25.23 | 1.50 | 1.60311 | 60.6 | 3.2 | −0.0003 |
| 6 | 104.21 | 4.50 |  |  |  |  |
| 7 | 527.21 | 6.53 | 1.60342 | 38.0 | 2.8 | 0.0036 |
| 8 | −33.28 | (VARIABLE) |  |  |  |  |
| 9 | 79.82 | 3.59 | 1.66998 | 39.3 | 5.1 | 0.0037 |
| 10 | −210.12 | (VARIABLE) |  |  |  |  |
| 11 | 36.53 | 3.80 | 1.51680 | 64.2 | 3.0 | −0.0007 |
| 12 | 7504.65 | 4.23 |  |  |  |  |
| 13(STO) |  | (VARIABLE) |  |  |  |  |
| 14 | 309.80 | 1.00 | 1.83400 | 37.2 | 8.1 | −0.0037 |
| 15 | 19.13 | 5.28 | 1.48749 | 70.2 | −0.6 | 0.0043 |
| 16 | −38.25 | (VARIABLE) |  |  |  |  |
| 17 | −19.33 | 1.10 | 1.83400 | 37.2 | 8.1 | −0.0037 |
| 18 | 47.26 | 5.38 | 1.48749 | 70.2 | −0.6 | 0.0043 |
| 19 | −27.62 | 0.50 |  |  |  |  |
| 20 | 97.46 | 7.17 | 1.48749 | 70.2 | −0.6 | 0.0043 |
| 21 | −24.53 | (VARIABLE) |  |  |  |  |
| 22 | 186.01 | 2.76 | 1.80518 | 25.4 | 1.8 | 0.0151 |
| 23 | −100.56 | 1.00 |  |  |  |  |
| PRISM |  | 28.00 | 1.51633 | 64.1 | 2.8 | −0.0007 |
| PRISM |  | 18.00 | 1.80518 | 25.4 | 1.8 | 0.0151 |

ANOMALOUS DISPERSION VALUE = θgF − (0.6438 − 0.001682 × vd)
(#)ASPHERIC SURFACE

SURFACE DISTANCE

| SURFACE NO. | WIDE-ANGLE END | TELEPHOTO END |
|---|---|---|
| 8 | 16.67 | 0.70 |
| 10 | 40.83 | 27.04 |
| 13 | 11.89 | 21.39 |
| 16 | 2.57 | 5.41 |
| 21 | 5.14 | 22.56 |

ASPHERIC COEFFICIENT

| SURFACE. NO. | K | A | B | C | D | E |
|---|---|---|---|---|---|---|
| 3 | −8.653E−01 | 3.926E−05 | −1.694E−07 | 6.613E−10 | −1.070E−12 | 2.387E−16 |
| 4 | −4.329E+00 | 5.292E−05 | −2.753E−07 | 8.831E−10 | −1.443E−12 | −1.109E−15 |

TABLE 2

NUMERICAL EXAMPLE 2 fw: 16.69
ft: 24.72
Fno: 1.95~2.59

|  | r | d | Nd | vd | dn/dt(10$^{-6}$) | X |
|---|---|---|---|---|---|---|
| SCREEN |  | 2100.00 |  |  |  |  |
| 1 | 38.97 | 1.90 | 1.74950 | 35.3 | 6.2 | 0.0024 |
| 2 | 18.25 | 6.25 |  |  |  |  |
| 3(#) | 60.00 | 2.80 | 1.52996 | 55.8 | −83.9 | — |
| 4(#) | 24.63 | 9.96 |  |  |  |  |
| 5 | −24.76 | 1.50 | 1.60311 | 60.6 | 3.2 | −0.0003 |
| 6 | 181.14 | 3.83 |  |  |  |  |
| 7 | 1035.79 | 6.27 | 1.60342 | 38.0 | 2.8 | 0.0036 |
| 8 | −33.35 | (VARIABLE) |  |  |  |  |
| 9 | 102.51 | 3.12 | 1.83400 | 37.2 | 8.1 | −0.0037 |
| 10 | −247.75 | (VARIABLE) |  |  |  |  |
| 11 | 38.60 | 4.03 | 1.51680 | 64.2 | 3.0 | −0.0007 |
| 12 | −558.66 | 12.10 |  |  |  |  |
| 13(STO) |  | (VARIABLE) |  |  |  |  |
| 14 | 280.34 | 1.00 | 1.83400 | 37.2 | 8.1 | −0.0037 |
| 15 | 19.90 | 5.33 | 1.48749 | 70.2 | −0.6 | 0.0043 |
| 16 | −40.04 | (VARIABLE) |  |  |  |  |
| 17 | −20.14 | 1.10 | 1.83400 | 37.2 | 8.1 | −0.0037 |
| 18 | 49.06 | 5.40 | 1.48749 | 70.2 | −0.6 | 0.0043 |
| 19 | −28.35 | 0.20 |  |  |  |  |
| 20 | 93.19 | 7.68 | 1.48749 | 70.2 | −0.6 | 0.0043 |
| 21 | −25.56 | (VARIABLE) |  |  |  |  |
| 22 | 176.60 | 2.87 | 1.80518 | 25.4 | 1.8 | 0.0151 |
| 23 | −105.66 | 1.00 |  |  |  |  |
| PRISM |  | 28.00 | 1.51633 | 64.1 | 2.8 | −0.0007 |
| PRISM |  | 18.00 | 1.80518 | 25.4 | 1.8 | 0.0151 |

ANOMALOUS DISPERSION VALUE = θgF − (0.6438 − 0.001682 × vd)
(#)ASPHERIC SURFACE

SURFACE DISTANCE

| SURFACE NO. | WIDE-ANGLE END | TELEPHOTO END |
|---|---|---|
| 8 | 15.44 | 0.70 |
| 10 | 42.73 | 27.78 |
| 13 | 4.16 | 14.14 |
| 16 | 2.58 | 5.17 |
| 21 | 4.75 | 21.86 |

ASPHERIC COEFFICIENT

| SURFACE. NO | K | A | B | C | D | E |
|---|---|---|---|---|---|---|
| 3 | −8.653E−01 | 3.884E−05 | −1.914E−07 | 8.984E−10 | −2.099E−12 | 1.873E−15 |
| 4 | −4.329E+00 | 5.972E−05 | −3.240E−07 | 1.302E−09 | −3.213E−12 | 1.805E−15 |

TABLE 3

NUMERICAL EXAMPLE 3 fw: 16.70
ft: 24.72
Fno: 1.95~2.54

|  | r | d | Nd | vd | dn/dt(10$^{-6}$) | X |
|---|---|---|---|---|---|---|
| SCREEN |  | 2100.00 |  |  |  |  |
| 1 | 36.67 | 1.90 | 1.74950 | 35.3 | 6.2 | 0.0024 |
| 2 | 18.15 | 6.53 |  |  |  |  |
| 3(#) | 60.00 | 2.80 | 1.52996 | 55.8 | −83.9 | — |
| 4(#) | 25.02 | 9.64 |  |  |  |  |
| 5 | −23.05 | 1.50 | 1.60311 | 60.6 | 3.2 | −0.0003 |
| 6 | 61.26 | (VARIABLE) |  |  |  |  |
| 7 | 113.97 | 6.79 | 1.60342 | 38.0 | 2.8 | 0.0036 |
| 8 | −30.87 | (VARIABLE) |  |  |  |  |
| 9 | 105.54 | 3.13 | 1.77250 | 49.6 | 4.7 | −0.0084 |
| 10 | −185.06 | (VARIABLE) |  |  |  |  |
| 11 | 39.55 | 3.47 | 1.51680 | 64.2 | 3.0 | −0.0007 |

TABLE 3-continued

| | | | | | | |
|---|---|---|---|---|---|---|
| 12 | 458.65 | 17.82 | | | | |
| 13(STO) | | (VARIABLE) | | | | |
| 14 | 116.12 | 1.00 | 1.83400 | 37.2 | 8.1 | −0.0037 |
| 15 | 22.36 | 5.34 | 1.48749 | 70.2 | −0.6 | 0.0043 |
| 16 | −35.57 | 2.47 | | | | |
| 17 | −22.27 | 1.10 | 1.83400 | 37.2 | 8.1 | −0.0037 |
| 18 | 37.93 | 5.03 | 1.48749 | 70.2 | −0.6 | 0.0043 |
| 19 | −44.66 | 0.20 | | | | |
| 20 | 78.17 | 7.68 | 1.48749 | 70.2 | −0.6 | 0.0043 |
| 21 | −25.67 | (VARIABLE) | | | | |
| 22 | 84.14 | 2.96 | 1.80518 | 25.4 | 1.8 | 0.0151 |
| 23 | −255.33 | 1.00 | | | | |
| PRISM | | 28.00 | 1.51633 | 64.1 | 2.8 | −0.0007 |
| PRISM | | 18.00 | 1.80518 | 25.4 | 1.8 | 0.0151 |

ANOMALOUS DISPERSION VALUE = θgF − (0.6438 − 0.001682 × vd)
(#)ASPHERIC SURFACE

SURFACE DISTANCE

| SURFACE NO. | WIDE-ANGLE END | TELEPHOTO END |
|---|---|---|
| 6 | 2.50 | 3.25 |
| 8 | 17.06 | 0.70 |
| 10 | 42.74 | 27.32 |
| 13 | 2.74 | 12.28 |
| 21 | 0.60 | 22.08 |

ASPHERIC COEFFICIENT

| SURFACE. NO. | K | A | B | C | D | E |
|---|---|---|---|---|---|---|
| 3 | −8.653E−01 | 2.493E−05 | −1.058E−07 | 5.033E−10 | −1.175E−12 | 1.325E−15 |
| 4 | −4.329E+00 | 3.906E−05 | −2.308E−07 | 8.147E−10 | −2.078E−12 | 1.095E−15 |

TABLE 4

NUMERICAL EXAMPLE 4 fw: 16.75
ft: 24.81
Fno: 1.85~2.31

| | r | d | Nd | vd | dn/dt(10⁻⁶) | X |
|---|---|---|---|---|---|---|
| SCREEN | | 2100.00 | | | | |
| 1 | 33.16 | 2.20 | 1.74950 | 35.3 | 4.2 | 0.0024 |
| 2 | 21.29 | 6.78 | | | | |
| 3(#) | 86.37 | 3.00 | 1.52996 | 55.8 | −83.9 | — |
| 4(#) | 27.63 | 11.49 | | | | |
| 5 | −25.97 | 1.60 | 1.51823 | 58.9 | 0.9 | 0.0010 |
| 6 | 59.31 | 6.43 | | | | |
| 7 | 1475.23 | 5.57 | 1.83400 | 37.2 | 8.1 | −0.0037 |
| 8 | −43.13 | (VARIABLE) | | | | |
| 9 | 51.41 | 3.47 | 1.72000 | 50.2 | 5.6 | −0.0073 |
| 10 | 23945.98 | 18.06 | | | | |
| 11(STO) | | (VARIABLE) | | | | |
| 12 | 70.71 | 3.14 | 1.51633 | 64.1 | 2.8 | −0.0007 |
| 13 | −44.77 | (VARIABLE) | | | | |
| 14 | −32.91 | 1.00 | 1.83400 | 37.2 | 8.1 | −0.0037 |
| 15 | 25.82 | 5.52 | 1.48749 | 70.2 | −0.6 | 0.0043 |
| 16 | −23.10 | 2.54 | | | | |
| 17 | −20.02 | 1.10 | 1.83400 | 37.2 | 8.1 | −0.0037 |
| 18 | 156.93 | 4.29 | 1.48749 | 70.2 | −0.6 | 0.0043 |
| 19 | −27.53 | 1.95 | | | | |
| 20 | 204.42 | 6.95 | 1.48749 | 70.2 | −0.6 | 0.0043 |
| 21 | −25.73 | (VARIABLE) | | | | |
| 22 | 52.54 | 3.03 | 1.80518 | 25.4 | 1.8 | 0.0151 |
| 23 | 580.23 | 2.00 | | | | |
| PRISM | | 28.00 | 1.51633 | 64.1 | 2.8 | −0.0007 |
| PRISM | | 18.00 | 1.80518 | 25.4 | 1.8 | 0.0151 |

ANOMALOUS DISPERSION VALUE = θgF − (0.6438 − 0.001682 × vd)
(#)ASPHERIC SURFACE

TABLE 4-continued

SURFACE DISTANCE

| SURFACE NO. | WIDE-ANGLE END | TELEPHOTO END |
|---|---|---|
| 8 | 36.55 | 7.20 |
| 11 | 17.24 | 24.08 |
| 13 | 2.26 | 5.75 |
| 21 | 0.82 | 19.84 |

ASPHERIC COEFFICIENT

| SURFACE. NO. | K | A | B | C | D | E |
|---|---|---|---|---|---|---|
| 3 | −8.653E−01 | 3.641E−05 | −1.275E−07 | 4.843E−10 | −1.061E−12 | 1.298E−15 |
| 4 | −4.329E+00 | 5.490E−05 | −1.961E−07 | 6.780E−10 | −1.709E−12 | 2.432E−15 |

TABLE 5

NUMERICAL EXAMPLE 5 fw: 16.74
ft: 24.80
Fno: 1.85~2.32

|   | r | d | Nd | νd | dn/dt(10⁻⁶) | X |
|---|---|---|---|---|---|---|
| SCREEN |  | 2100.00 |  |  |  |  |
| 1(#) | 40.56 | 2.20 | 1.69680 | 55.5 | 4.2 | −0.0070 |
| 2(#) | 21.82 | 6.89 |  |  |  |  |
| 3 | 166.43 | 3.00 | 1.52996 | 55.8 | −83.9 | — |
| 4 | 35.72 | 11.71 |  |  |  |  |
| 5 | −28.90 | 1.60 | 1.48749 | 70.2 | −0.6 | 0.0043 |
| 6 | 58.39 | 4.22 |  |  |  |  |
| 7 | 153.32 | 5.56 | 1.83400 | 37.2 | 8.1 | −0.0037 |
| 8 | −53.07 | (VARIABLE) |  |  |  |  |
| 9 | 45.25 | 4.30 | 1.69680 | 55.5 | 4.2 | −0.0070 |
| 10 | −850.27 | 27.20 |  |  |  |  |
| 11(STO) |  | (VARIABLE) |  |  |  |  |
| 12 | 63.68 | 1.99 | 1.51633 | 64.1 | 2.8 | −0.0007 |
| 13 | −5116.25 | (VARIABLE) |  |  |  |  |
| 14 | −47.54 | 1.00 | 1.83400 | 37.2 | 8.1 | −0.0037 |
| 15 | 21.53 | 5.97 | 1.48749 | 70.2 | −0.6 | 0.0043 |
| 16 | −22.40 | 2.80 |  |  |  |  |
| 17 | −17.43 | 1.10 | 1.83400 | 37.2 | 8.1 | −0.0037 |
| 18 | −172.76 | 4.28 | 1.48749 | 70.2 | −0.6 | 0.0043 |
| 19 | −21.72 | 4.16 |  |  |  |  |
| 20 | 572.64 | 7.36 | 1.48749 | 70.2 | −0.6 | 0.0043 |
| 21 | −26.13 | (VARIABLE) |  |  |  |  |
| 22 | 46.40 | 3.43 | 1.72151 | 29.2 | 3.1 | 0.0106 |
| 23 | 271.81 | 2.00 |  |  |  |  |
| PRISM |  | 28.00 | 1.51633 | 64.1 | 2.8 | −0.0007 |
| PRISM |  | 18.00 | 1.80518 | 25.4 | 1.8 | 0.0151 |

ANOMALOUS DISPERSION VALUE = θgF − (0.6438 − 0.001682 × νd)
(#)ASPHERIC SURFACE

SURFACE DISTANCE

| SURFACE NO. | WIDE-ANGLE END | TELEPHOTO END |
|---|---|---|
| 8 | 45.28 | 16.72 |
| 11 | 1.00 | 4.25 |
| 13 | 2.98 | 6.70 |
| 21 | 1.98 | 23.57 |

ASPHERIC COEFFICIENT

| SURFACE NO. | K | A | B | C | D | E |
|---|---|---|---|---|---|---|
| 3 | −8.653E−01 | 5.198E−05 | −1.738E−07 | 5.671E−10 | −1.123E−12 | 1.127E−15 |
| 4 | −4.329E+00 | 5.904E−05 | −1.937E−07 | 5.736E−10 | −1.251E−12 | 1.377E−15 |

TABLE 6

NUMERICAL EXAMPLE 6 fw: 16.74
ft: 24.73
Fno: 1.95~2.55

| | r | d | Nd | vd | dn/dt(10$^{-6}$) | X |
|---|---|---|---|---|---|---|
| SCREEN | | 2100.00 | | | | |
| 1 | 39.71 | 1.90 | 1.74950 | 35.3 | 6.2 | 0.0024 |
| 2 | 18.74 | 5.94 | | | | |
| 3(#) | 60.00 | 2.80 | 1.52996 | 55.8 | −83.9 | — |
| 4(#) | 25.88 | 10.46 | | | | |
| 5 | −24.46 | 1.50 | 1.60311 | 60.6 | 3.2 | −0.0003 |
| 6 | 135.39 | 4.73 | | | | |
| 7 | −21784.11 | 6.42 | 1.60342 | 38.0 | 2.8 | 0.0036 |
| 8 | −33.50 | (VARIABLE) | | | | |
| 9 | 88.20 | 3.71 | 1.66998 | 39.3 | 5.1 | 0.0037 |
| 10 | −173.86 | (VARIABLE) | | | | |
| 11 | 36.32 | 4.28 | 1.51680 | 64.2 | 3.0 | −0.0007 |
| 12 | −4185.69 | 9.91 | | | | |
| 13(STO) | | (VARIABLE) | | | | |
| 14 | −296.11 | 1.00 | 1.83400 | 37.2 | 8.1 | −0.0037 |
| 15 | 19.95 | 5.16 | 1.48749 | 70.2 | −0.6 | 0.0043 |
| 16 | −35.68 | 0.49 | | | | |
| 17 | 193.01 | 1.79 | 1.49700 | 81.5 | −6.1 | 0.0310 |
| 18 | −660.90 | (VARIABLE) | | | | |
| 19 | −19.09 | 1.10 | 1.83400 | 37.2 | 8.1 | −0.0037 |
| 20 | 45.97 | 5.27 | 1.48749 | 70.2 | −0.6 | 0.0043 |
| 21 | −27.41 | 0.50 | | | | |
| 22 | 110.17 | 7.71 | 1.48749 | 70.2 | −0.6 | 0.0043 |
| 23 | −23.56 | (VARIABLE) | | | | |
| 24 | 156.03 | 2.83 | 1.80518 | 25.4 | 1.8 | 0.0151 |
| 25 | −106.43 | 1.00 | | | | |
| PRISM | | 28.00 | 1.51680 | 64.2 | 2.8 | −0.0007 |
| PRISM | | 18.00 | 1.80518 | 25.4 | 1.8 | 0.0151 |

ANOMALOUS DISPERSION VALUE = θgF − (0.6438 − 0.001682 × vd)
(#)ASPHERIC SURFACE

SURFACE DISTANCE

| SURFACE NO. | WIDE-ANGLE END | TELEPHOTO END |
|---|---|---|
| 8 | 15.42 | 0.70 |
| 10 | 38.17 | 22.75 |
| 13 | 7.83 | 17.42 |
| 18 | 3.40 | 5.63 |
| 23 | 2.67 | 20.99 |

ASPHERIC COEFFICIENT

| SURFACE NO. | K | A | B | C | D | E |
|---|---|---|---|---|---|---|
| 3 | −8.653E−01 | 4.385E−05 | −1.719E−07 | 6.818E−10 | −1.210E−12 | 9.533E−16 |
| 4 | −4.329E+00 | 6.189E−05 | −2.726E−07 | 8.542E−10 | −1.188E−12 | −8.527E−16 |

TABLE 7

| NUMERICAL EXAMPLE | LENS UNIT CONFIGURATION | ① | ②MAX | ③ | ④ | ⑤ | ⑥ | ⑦ |
|---|---|---|---|---|---|---|---|---|
| 1 | N P P N P P | 4.488 | 8.1 × 10$^{-6}$ | 0.5076 | 0.5000 | 0.25 | 0.0013 | 0.0056 |
| 2 | N P P P N P | 4.488 | 8.1 × 10$^{-6}$ | 0.5113 | 0.5000 | 0.24 | −0.0020 | 0.0056 |
| 3 | N P P P P P | 4.488 | 8.1 × 10$^{-6}$ | 0.5278 | 0.5000 | 0.27 | −0.0003 | 0.0057 |
| 4 | N P P N P | 4.488 | 8.1 × 10$^{-6}$ | 0.5532 | 0.5000 | 0.27 | −0.0003 | 0.0057 |
| 5 | N P P P P | 4.488 | 8.1 × 10$^{-6}$ | 0.5340 | 0.5000 | 0.28 | −0.0049 | 0.0052 |
| 6 | N P P N P P | 4.488 | 8.1 × 10$^{-6}$ | 0.7798 | 0.5000 | 0.26 | 0.0013 | 0.0064 |

As described above, in each of the embodiments, the low-dispersion material having the effect to correct the chromatic aberration and the material having the effect to correct the focus variations are adequately used in the zoom lens having a long back focus. Therefore, the image projection optical system can be realized in which the longitudinal chromatic aberration and the chromatic aberration of magnification are corrected well and the focus variations due to the temperature changes are reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Furthermore, the present invention is not limited to these embodiments and various variations and modifications may be made without departing from the scope of the present invention.

This application claims foreign priority benefits based on Japanese Patent Application No. 2007-086949, filed on Mar. 29, 2007, which is hereby incorporated by reference herein in its entirety as if fully set forth herein.

What is claimed is:

1. An image projection optical system comprising:
an optical element into which light from an image-forming element forming an original image enters; and
a zoom lens magnifying and projecting the light from the optical element onto a projection surface,
wherein the optical element satisfies the following condition (1),
wherein the zoom lens includes, in order from a magnification side, a first lens unit, a second lens unit, and a plurality of lens units disposed closer to a reduction side than the second lens unit,
wherein, the first lens unit is a negative lens unit,
wherein the plurality of lens units disposed closer to the reduction side than the second lens unit satisfies the following condition (2),
wherein magnification-side positive lens elements disposed closer to the magnification side than a negative lens element whose effective diameter is smallest in the plurality of lens units disposed closer to the reduction side than the second lens unit satisfy the following condition (3), and
wherein reduction-side positive lens elements disposed closer to the reduction side than the negative lens element whose effective diameter is smallest satisfy the following condition (4):

$$\Sigma(Di \times Ndi)/fw > 4.0 \quad (1)$$

$$|dn/dt| < 1.0 \times 10^{-5} \quad (2)$$

where Di represents a length of the optical element along an optical path from the image-forming element toward the zoom lens, Ndi represents a refractive index of a material forming the optical element for a d-line, fw represents a focal length of the zoom lens at a wide-angle end, and dn/dt represents a change amount of a refractive index of a material forming each of the plurality of lens units disposed closer to the reduction side than the second lens unit for the d-line, the refractive index change being caused by a temperature change from 25° C., $$\{9.0 \times \Sigma(1/fpA) + 5.0 \times \Sigma(1/fpB) + 0.5 \times \Sigma(1/fpC)\}/\Sigma(1/fp) < 1 \quad (3)$$

$$\{9.0 \times \Sigma(1/fpA) + 0.3 \times \Sigma(1/fpB) + 2.0 \times \Sigma(1/fpC)\}/\Sigma(1/fp) < 1 \quad (4)$$

where fpA, fpB, and fpC represent focal lengths of the magnification-side positive lens elements or the reduction-side positive lens elements, whose materials are respectively included in an A-region of an Abbe number vd of vd>75, a B-region of 68<vd<75, and a C-region of 68>vd, and fp represents an entire focal length of all the magnification-side positive lens elements or all the reduction-side positive lens elements, whose materials are included in the A-region, the B-region, and the C-region.

2. The image projection optical system according to claim 1, wherein a most-reduction-side lens unit disposed closest to the reduction side does not move for varying a magnification of the zoom lens and satisfies the following condition (5):

$$Dnwt/fe > 0.15 \quad (5)$$

where Dnwt represents a movement amount of another lens unit including the negative lens element whose effective diameter is smallest between a wide-angle end and a telephoto end of the zoom lens, and fe represents a focal length of the most-reduction-side lens unit.

3. The image projection optical system according to claim 1, wherein positive lens elements disposed closer to the reduction side than the first lens unit and disposed closer to the magnification side than the negative lens element whose effective diameter is smallest satisfy the following condition (6):

$$\Sigma\{Xi \times (1/fpi)\}/\Sigma(1/fpi) < 0.0015 \quad (6)$$

where Xi represents an anomalous dispersion value of a material forming an i-th positive lens element of the positive lens elements, which is counted from the magnification side, the anomalous dispersion value Xi being defined as:

$$Xi = \theta gFi - (0.6438 - 0.001682 \times vdi)$$

where θgFi represents an anomalous partial dispersion value of the material of the i-th positive lens element, which is defined as θgFi=(Ng−Nf)/(Nf−Nc), Ng, Nf, and Nc respectively representing refractive indexes thereof for a g-line, an F-line, and a C-line, vdi represents an Abbe number thereof, and fpi represents a focal length of the i-th positive lens element.

4. The image projection optical system according to claim 3, wherein the optical system satisfies the following condition (7):

$$\Sigma\{Xi \times (1/fpi)\}/\Sigma(1/fpi) < 0. \quad (7)$$

5. The image projection optical system according to claim 1, wherein positive lens elements disposed closer to the reduction side than the negative lens element whose effective diameter is smallest satisfy the following condition (8):

$$\Sigma\{Xi \times (1/fpi)\}/\Sigma(1/fpi) > 0 \quad (8)$$

where Xi represents an anomalous dispersion value of a material forming an i-th positive lens element of the positive lens elements, which is counted from the magnification side, the anomalous dispersion value Xi being defined as:

$$Xi = \theta gFi - (0.6438 - 0.001682 \times vdi)$$

where θgFi represents an anomalous partial dispersion value of the material of the i-th positive lens element, which is defined as θgFi=(Ng−Nf)/(Nf−Nc), Ng, Nf, and Nc respectively representing refractive indexes thereof for a g-line, an F-line, and a C-line, vdi represents an Abbe number thereof, and fpi represents a focal length of the i-th positive lens element.

6. An image projection apparatus comprising:
an image-forming element illuminated with light from a light source; and
the image projection optical system according to claim 1.

* * * * *